United States Patent
Fonseka et al.

(10) Patent No.: US 7,561,624 B2
(45) Date of Patent: Jul. 14, 2009

(54) MULTI-INTERVAL LINE CODING FOR HIGH SPEED DATA COMMUNICATION

(76) Inventors: John P. Fonseka, 1709 Amber La., Plano, TX (US) 75075; Jin Liu, 3412 Matagorda Spring Dr., Plano, TX (US) 75025

( * ) Notice: Subject to any disclaimer, the term of this patent is extended or adjusted under 35 U.S.C. 154(b) by 772 days.

(21) Appl. No.: 10/994,465

(22) Filed: Nov. 22, 2004

(65) Prior Publication Data

US 2006/0109917 A1    May 25, 2006

(51) Int. Cl.
*H04B 14/04*     (2006.01)
(52) U.S. Cl. .................. 375/242; 364/146; 364/138; 364/261; 364/219; 370/347; 332/112
(58) Field of Classification Search ............. 375/242, 375/364, 261, 138, 146, 286, 239, 298, 219; 370/347; 332/112; 378/242
See application file for complete search history.

(56) References Cited

U.S. PATENT DOCUMENTS

| | | | | |
|---|---|---|---|---|
| 6,175,599 | B1 * | 1/2001 | Lyon et al. ............... | 375/261 |
| 6,532,253 | B1 * | 3/2003 | Chen ....................... | 375/146 |
| 7,082,153 | B2 * | 7/2006 | Balachandran et al. ...... | 375/138 |

OTHER PUBLICATIONS

R. Farjad-Rad, C.-K. K. Yang, M. Horowitz and T.H. Lee, "A 0.3μ m CMOS 8-Gb/s 4-PAM serial link transceiver," IEEE Journal of Solid-State Circuits, vol. 35, pp. 757-764, May 2000.

J.T. Stonick, G.-Y. Wei, J.L. Sonntag and D.K. Weinlader, "An adaptive PAM-4 5-Gb/s backplane transceiver in 0.25μ m CMOS," IEEE Journal of Solid-State Circuits, vol. 38, pp. 436-443, Mar. 2003.

K. Yamaguchi, M. Fukaishi, T. Sakamoto, N. Akiyama, and K. Nakamura, "A 2.5-GHz Four-Phase Clock Generator with Scalable No-feedback-loop Architecture," IEEE J. Solid-State Circuits, vol. 36, pp. 1666-1672, Nov. 2001.

T. Saeki, M. Mitsuishi, H. Iwaki, M. Tagishi, "A 1.3-cycle lock time, Non-PLL/DLL clock multiplier based on direct clock cycle interpolation for clock on demand", IEEE J. Solid-State circuits, vol. 35, pp. 1581-1590, Nov. 2000.

(Continued)

*Primary Examiner*—Chieh M. Fan
*Assistant Examiner*—Eva Puente
(74) *Attorney, Agent, or Firm*—Miller Patent Services; Jerry A. Miller

(57) ABSTRACT

Binary data signal multi-line interval encoding and decoding arrangements supporting high speed data communications consistent with certain embodiments produce a signal having a plurality of pulses with a minimum pulse duration of T. The pulses are arranged in a signal pattern selected as one of M possible signal patterns of L bits transmitted over N time intervals, with each time interval being of T seconds in duration, to represent one of M possible message sequence, where $M > 2^N$. The plurality of pulses have transitions that occur at times falling between the boundaries of the time interval T. Embodiments may be implemented in hardware, with a computer executing a software program within, or with both. This abstract is not to be considered limiting, since other embodiments may deviate from the features described in this abstract.

83 Claims, 10 Drawing Sheets

OTHER PUBLICATIONS

B.W. Garlepp, K.S. Donnelly, J. Kim, P.S. Chau, J.L. Zerbe, C. Huang, C.V. Tran, C.L. Portmann, D. Stark, Y. Chan, T.H. Lee, and M.A. Horowitz "A portable digital DLL for high-speed CMOS interface circuits", IEEE J. Solid-State circuits, vol. 34, pp. 632-644, May 1999.

L. Yang and J. Yuan, "An arbitrarily skewable multiphase clock generator combining direct interpolation with phase error average", Proceedings of International Symposium on Circuits and Systems, vol. 1, pp. 25-28, May 2003.

I. Kalet and S. Shamai, "On the capacity of twisted wire pair: Gaussian model", IEEE Transactions on Communications, vol. 38, pp. 379-383, Mar. 1990 [11] Workshop on Analog Telecom and Circuit Concepts, IEEE International Solid-State Circuits Conference, Feb. 2003.

A. J. Baker, "*An Adaptive Equalizer for Serial Digital Video Rates to 400Mb/s*", IEEE International Solid-State Circuits Conference Digest of Technical Papers, pp. 174-175, 1996.

\* cited by examiner

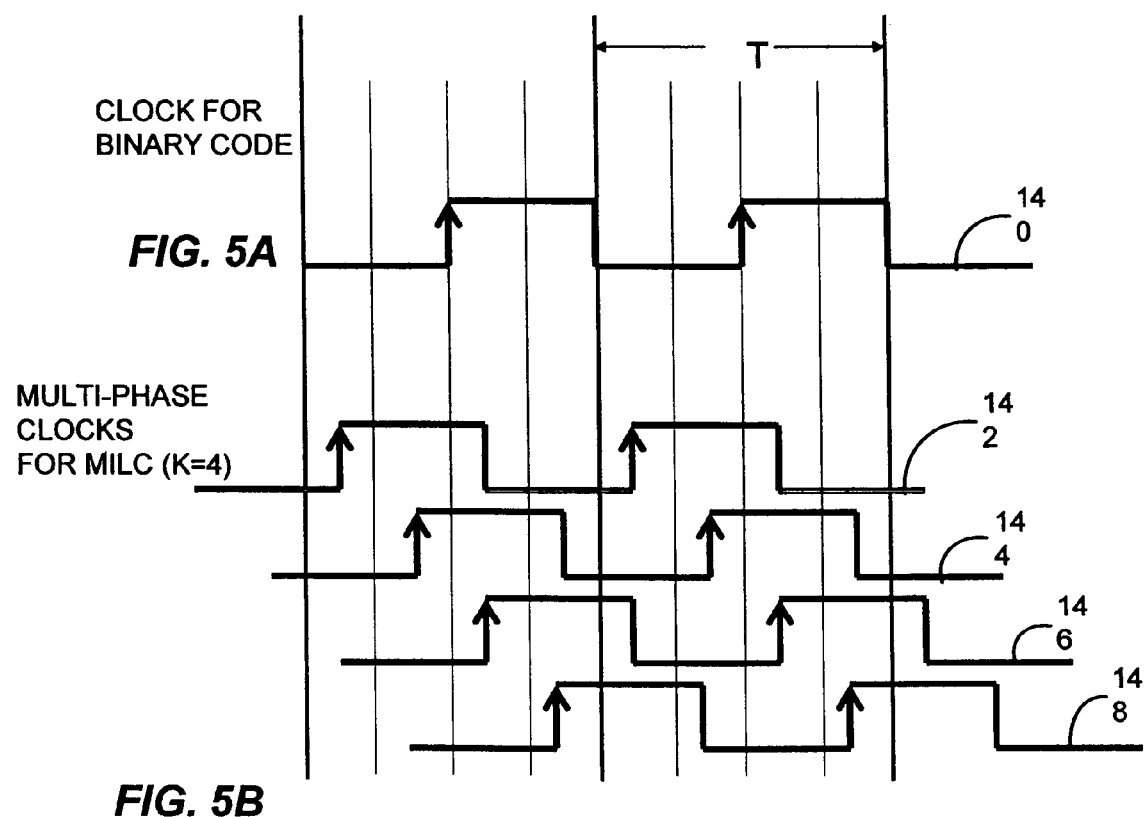

MULTI-INTERVAL LINE CODING FOR HIGH SPEED DATA COMMUNICATION

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of contract No. ECS-0120396 awarded by the National Science Foundation.

FIELD OF THE INVENTION

This invention, in accordance with certain embodiments thereof, relates generally to high speed data communication, and more particularly certain embodiments relate to a multi-interval line coding arrangement that facilitates high speed data communication. The term data communication, as used herein, is defined below.

BACKGROUND

With the advances in digital technology, there has been increasing demand to transmit digital information from place to place efficiently at higher rates. However, non-ideal properties of the communication media limit the transmission rate. For example, in chip-to-chip communications for backplane, front plane, and main-frame/personal computer applications, digital data are transmitted through a printed circuit board (PCB) trace, which causes frequency dependent loss, C(f). This loss can be modeled in the manner described in A. J. Baker, "*An Adaptive Equalizer for Serial Digital Video Rates to 400 Mb/s*", IEEE International Solid-State Circuits Conference Digest of Technical Papers, pp. 174-175, 1996, as:

$$C(f) = e^{-[h_s(1+j)\sqrt{f} + h_d f]l}, \quad (1)$$

where, $h_s$ is the skin-effect loss coefficient, $h_d$ is the dielectric loss coefficient, l is the length of the media, and f is the frequency.

Thus, digital transmission, over channels such as PCB traces or cables, suffers from attenuation limiting the transmission speed and cable length. To improve data communication quality for better Bit Error Rate (BER), 8B10B coding is commonly used today for baseband data communications. This coding has 25% overhead, i.e. if the data are transmitted at 1 Gbps, the actual information rate is 800 Mbps, thus further limiting the actual data throughput.

In addition to channel loss, crosstalk noise is also a dominant noise factor in the channel. Frequency dependent loss within the signal bandwidth causes inter-symbol-interference (ISI), which in turn causes errors in data recovery at the receiver. As a result, the transmission data rate and the transmission distance are limited. To increase the data transmission throughput without increasing the symbol rate, multi-level (higher order) signaling methods, like 4-PAM, (four level Pulse Amplitude Modulation) and 8-PAM, have been proposed and implemented, for example in R. Farjad-Rad, C.-K. K. Yang, M. Horowitz and T. H. Lee, "A 0.3 μm CMOS 8-Gb/s 4-PAM Serial Link Transceiver," IEEE Journal of Solid-State Circuits, Vol. 35, pp. 757-764, May 2000; and in J. T. Stonick, G.-Y. Wei, J. L. Sonntag and D. K. Weinlader, "An Adaptive PAM-4 5-Gb/s Backplane Transceiver in 0.25 μm CMOS," IEEE Journal of Solid-State Circuits, Vol. 38, pp. 436-443, March 2003.

For the same data throughput, 4-PAM transmits data at half the rate of ordinary binary signaling (2-PAM). This is advantageous since the channel loss is smaller at lower frequencies. However, 4-PAM schemes that employ symbols $\{\pm 1, \pm 3\}$ suffer from the increased energy due to symbols $\pm 3$, and from having to use three thresholds to separate the symbols. Specifically, 4-PAM requires an average energy that is five times as much as ordinary binary, which has a significant impact on detection. Furthermore, if the same maximum amplitude is maintained, the separation between adjacent symbol amplitudes in 4-PAM is ⅓ of binary signaling, which results about a 9.5 dB loss in symbol power. As a result, the multi-level schemes present a higher level of difficulty for clock and data recovery, and an improvement over binary signaling is not guaranteed since the data throughput depends on the channel. For these reasons, higher order signaling does not appear to be promising for many applications of communication at high data rates. Hence, it is desirable to search for schemes that are binary, yet can increase the transmission rate without expanding the bandwidth.

SUMMARY OF CERTAIN EMBODIMENTS OF THE INVENTION

The present invention relates generally to methods, apparatus and signals that are capable of producing high speed data communications. No part of this summary should be construed to limit the scope of the invention. Objects, advantages and features of certain embodiments consistent with the invention will become apparent to those skilled in the art upon consideration of the detailed description of certain embodiments of the invention which follows.

In one embodiment consistent with the present invention a data signal encoding arrangement produces a signal having a plurality of pulses with a minimum pulse duration of T. The pulses are arranged in a signal pattern selected as one of M possible signal patterns of L bits transmitted over N time intervals, with each time interval being of T seconds in duration, to represent one of M possible message sequence, where $M > 2^N$. The plurality of pulses have transitions that occur at times falling between the boundaries of the time interval T. In certain embodiments, transitions are prohibited during either the first or last interval of a set of N time intervals. Of course, several other embodiments of the present invention are described and claimed herein.

The above summary is intended to illustrate one or more exemplary embodiments which will be best understood in conjunction with the detailed description to follow, and are not intended to limit the scope or meaning of the appended claims.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 5 is a graph of clock signals made up of FIG. 5A which illustrates a simple binary clock signal and FIG. 5B illustrates a four phase clock signal having four clock signals consistent with certain embodiments of the present invention.

FIG. 6, is made up of FIG. 6A and FIG. 6B, shows two power spectral density graphs, wherein FIG. 6A shows the simulated psd variations plotted with frequencies normalized to the average transmitted bit rate $1/T_b$ for the case of $I_1$, while

DETAILED DESCRIPTION

Figure 1A:
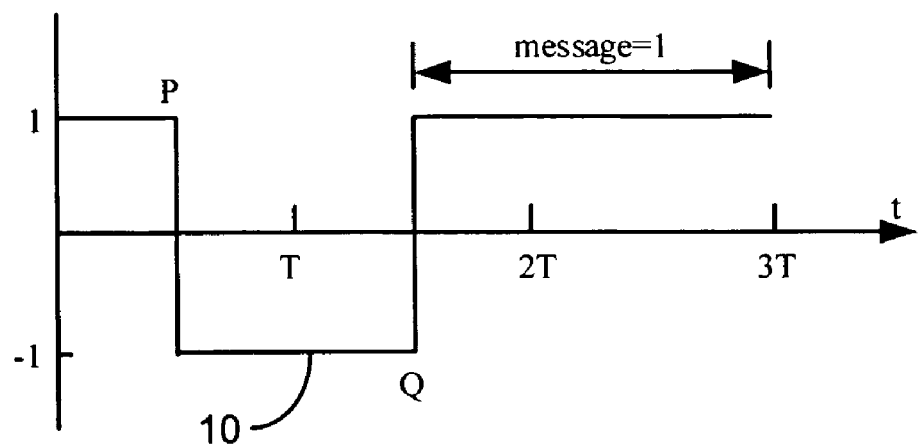
FIG. 1, which is made up of FIG. 1A and FIG. 1B, are timing diagrams illustrating state transitions.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a programmed processor (i.e., a computer system). A "program", or "computer program" or "software program", may include a subroutine, a function, a procedure, an object method, an object implementation, in an executable application, an applet, a servlet, a source code, an object code, a shared library/dynamic load library and/or any other sequence of instructions designed for execution on a computer system. Moreover, these terms are intended to embrace computer programs which are stored in any media whatsoever including, but not limited to non-volatile memory, volatile memory, disk storage, etc., without limitation. Thus, the term "software program" in the present document carries with it no implication of any particular media or exclusion from any particular media, but rather is simply a computer program or program as defined above. The terms "waveform" and "signal pattern" are used synonymously herein to mean a pattern of signal levels that are used to represent a message sequence.

The term "data communication", as used herein, should be interpreted more broadly than certain conventional definitions which may interpret the term as being applicable only in the context of node-to-node or computer-to-computer communication. As used herein, the term "data communication" should be given the broadest possible interpretation, encompassing the above forms of traditional data communication, but also encompassing all forms of data transmission and reception between or through devices such as circuit boards, transistor devices, connectors, integrated circuits, circuit board traces, system bus, memory bus, memories, memory controllers, subsystems, disk drives, controllers, processors, microcontrollers, microprocessors and other circuit level devices and components, backplanes, ribbon cables and other types of cables and wiring, and further encompasses communication within an integrated circuit, between integrated circuits, between circuit cards, from motherboards to daughterboards, between systems and devices, as well as between computers, network devices and nodes. That is, any communication of data from one point to another (in close proximity or relatively far away) is to be considered data communication for purposes of this document.

Ordinary binary transmission utilizes traditional line coding techniques. These traditional line coding techniques transmit waveforms that represent individual bits. Examples include non-return to zero (NRZ) or return to zero (RZ).

In accordance with embodiments consistent with the present invention, a encoding and decoding arrangement is proposed called "Multiple Interval Line Coding" (MILC) that performs line coding on sequences of bits in contrast to individual bits in order to increase the data transmission rate without need for additional bandwidth. In accordance with certain embodiments, it can be demonstrated that line coding on sequences can increase the actual information transfer rate without expanding the bandwidth. In the discussion to follow, the MILC technique is described, attractive MILC schemes are identified, and the detection of the signals is discussed. In addition, the proposed MILC schemes are analyzed for wireline data transmission over a PCB trace in presence of additive white Gaussian noise (AWGN). It is shown that the proposed MILC coding arrangements can perform significantly better than ordinary binary signals at the same information rate.

The multiple interval line coding technique (MILC) according to certain embodiments consistent with the present invention increases the effective transmission rate without increasing the order of signaling and without expanding the bandwidth. For example, when transmitting at the same bandwidth as 1 Gbps binary data, certain embodiments of MILC can achieve about 1.3 Gbps information rate depending upon the MILC scheme used. This is further contrasted with actual data throughput of 0.8 Gbps when using 8B10B coding.

Variable Definitions

For convenience and easy reference, the variables used throughout this discussion are summarized here:

T=the time duration of one bit, the bit interval or interval

K=the number of sub-intervals assigned per interval i=an integer j=an integer

N=number of intervals used to transmit M distinct waveforms or signal patterns, block length M=number of waveforms or signal patterns that can be transmitted over N intervals $S_i$=state number i, where i=0,1, . . . (K−1)

L=length of message sequence, where $M \geq 2^L$ $u_j$=signal pattern or waveform j representing message sequence Cj $C_j$=binary representation of message sequence j $I_j$=MILC scheme j that provides maximum data throughput for a given set of integer values of L, M and N D=sequence of decision variables S(f)=Power Spectral Density as a function of frequency f $S_{OB}(B)$=fractional out-of-band power variation over a bandwidth B
$P_e$=event error probability
$P_{be}$=bit error probability
$E_b$=bit energy
$h_d$=dielectric loss coefficient
$h_s$=skin effect loss coefficient
l=length
f=frequency The MILC Technique In order to provide an arrangement which in certain embodiments seeks to address many of the problems described above, a solution is presented in which the data rate is increased without increase of bandwidth while retaining use of binary data (e.g., as opposed to systems such as 4-PAM), several constraints are changed on the transmitted stream. One constraint that is imposed is that the duration of data pulse cannot exceed that of ordinary binary signaling. Thus, where T is the pulse duration of an ordinary binary signaling system, the pulse width for any data pulses in systems consistent with certain embodiments of the present invention should have pulse duration of $\geq T$. This constraint sets the maximum frequency of the spectrum generated by the resultant signal at no more than ordinary binary. In order to satisfy this constraint, embodiments consistent with the present invention utilize transmission of specific waveforms or signal patterns spanning multiple time intervals T within defined constraints in order to assure that the bandwidth is not increased, while increasing transmitted data throughput.

First consider a transmission over a block of N intervals of duration T, or equivalently over NT seconds, where T is the original bit duration. In ordinary binary signaling, N bits or $2^N$ different waveforms or signal patterns are transmitted over N intervals. Thus, for example, if N=4, $2^4$=16 different waveforms or signal patterns are transmitted over four intervals. This constraint is relaxed in MILC.

In embodiments of MILC, the number of waveforms or signal patterns transmitted during N intervals, M, is increased above $2^N$. Thus, if N=4, the number of waveforms M transmitted in MILC is greater than $2^4$. A value L can be defined such that a message sequence of length L can be transmitted using $2^L$ signal patterns (waveforms). This is accomplished by freeing the signal patterns of the restriction that transitions must occur at integer multiples of T, as in ordinary binary signaling. The largest integer L such that $M \geq 2^L$, L(>N) bits can be transmitted during N intervals by mapping message sequences of length L onto each of the $2^L$ selected waveforms. This increases the transmission bit rate by a factor L/N.

As previously mentioned, the number of distinct waveforms M in MILC is increased beyond $2^N$ by allowing transitions to occur during the time duration of the intervals in addition to the standard transitions at the end of intervals. This is in contrast to ordinary binary transmission wherein transitions are only allowed at the end (or equivalently the beginning) of an interval T. Specifically, with MILC, transitions are allowed to occur at time instants of the form iT/K by dividing every interval into K sub-intervals, where i is any integer and K is a pre-selected integer that defines the number of sub-intervals used in the particular MILC scheme. For example, if K=2, transitions are allowed to occur exactly in the middle and at the end of intervals; and for K=3, transitions are allowed to occur at T/3 and 2T/3 for each interval T as well as at the end of the interval. Signals with K=1 reduce to ordinary binary signals.

The possibility of making transitions during the interval (and not just at the ends of an interval) increases the number of distinct waveforms that can be transmitted during N intervals, and thus the amount of information that can be encoded over N intervals. However, recall that in the proposed MILC technique, the waveforms are selected so that the duration of any pulse within the waveform is at least T seconds in duration. This condition ensures that MILC signals have spectral variations comparable with ordinary binary signals, and thus, requires no more bandwidth than ordinary binary signals having transitions that occur only at the interval boundaries.

In accordance with the present illustrative embodiments, no transitions are permitted during the last interval of any block of N intervals, in order to assure that there are no pulses greater than T in width in the waveform. However, upon consideration of the present teachings, those of ordinary skill in the art will appreciate that an analogous coding arrangement can equivalently be devised in which no transitions are permitted during the first interval of each block. These techniques are entirely equivalent. The former is used herein for illustrative purposes, but the invention should not be considered limited by this illustrative example.

Thus, certain embodiments consistent with a MILC communication can have one or more of the following attributes:
Transitions in signal levels of the waveform (signal pattern) are permitted not only at integer multiples of the interval T, but also at times falling between the boundaries of the interval T.
Transitions in signal levels of the waveform are separated by at least the interval T.
Waveforms are observed over multiple (N) intervals, and those waveforms can be mapped to message sequences of length L for each of $2^L$ waveforms.
Transitions are not permitted in the waveform either during the first interval or alternatively during the last interval in a block of N intervals (one or the other).

Thus, a data signal, consistent with certain embodiments of the invention has a signal pattern selected as one of M possible signal patterns transmitted over N time intervals of T seconds that represent one of M possible message sequence, where $M>2^N$; wherein each time interval T has K sub-intervals, where K is an integer greater than one; and wherein, each of the M signal patterns of L bits having transitions in signal levels separated by at least T; and wherein transitions in signal levels occur not only at integer multiples of the interval T, but also at times falling between the boundaries of the interval T at approximately the boundaries of the K sub-intervals.

Another data signal, consistent with certain embodiments has a plurality of pulses having a minimum pulse duration of T; the pulses being arranged in a signal pattern selected as one of M possible signal patterns of L bits transmitted over N time intervals, with each time interval being of T seconds in duration, to represent one of M possible message sequence, where $M>2^N$; the plurality of pulses having transitions that occur at times falling between the boundaries of the time interval T.

A data signal, consistent with certain embodiments has a plurality of pulses having a minimum pulse duration of T arranged in data signal intervals; wherein transitions in the signal levels of the data signal are permitted not only at integer multiples of the interval T, but also at times falling between the boundaries of the interval T; wherein when data signals are observed over N intervals, the data signals can be mapped to M possible message sequences of length L for each of $2^L$ data signals, where $M \geq 2^L$; and wherein transitions are not permitted in the waveform either during the first interval or alternatively during the last interval in a block of N intervals.

Due to the finite number of transition points during an interval, the MILC signals have a finite state structure with states defined by the time instants at which amplitude transitions are allowed within intervals. Specifically, a scheme that makes transitions at times iT/K can be viewed as a K state system with states $S_i$, i=0, 1, ...(K−1). A waveform is in state $S_i$ if its last amplitude transition occurred at a time instant iT/K, until it moves into a different state, otherwise it will remain in state $S_i$. A waveform over N intervals can make state transitions as it develops with time. As a result the number of waveforms M can be increased. However, when a waveform makes state transitions, several intervals are used simply to establish those transitions. This reduces the number of intervals that actually transmit information.

Consider, for example, the signals shown in FIG. 1 in which N=3 intervals and K=2 sub-intervals are used per interval T. FIG. 1A shows a single state transition of a signal 10 during the first interval from state $S_0$ to $S_1$ of a scheme with K=2 and N=3 assuming the last amplitude level of the previous block is 1. By virtue of the last amplitude level of the prior block being 1, the duration of the pulse up to time T/2 is guaranteed to be greater than or equal to one interval T. The amplitude transition at point P (time T/2) is simply to establish the state transition and no information can be transmitted until point Q (time 3T/2). Hence, it takes 1.5 intervals to establish the transition which leaves time for only one message bit within the block transmitted at the end of the block which is assumed to be 1 in FIG. 1A. Recall that no transitions are permitted during the last interval in this example (2T to 3T) in order to guarantee that there are no pulses having duration less than T.

Figure 1B:
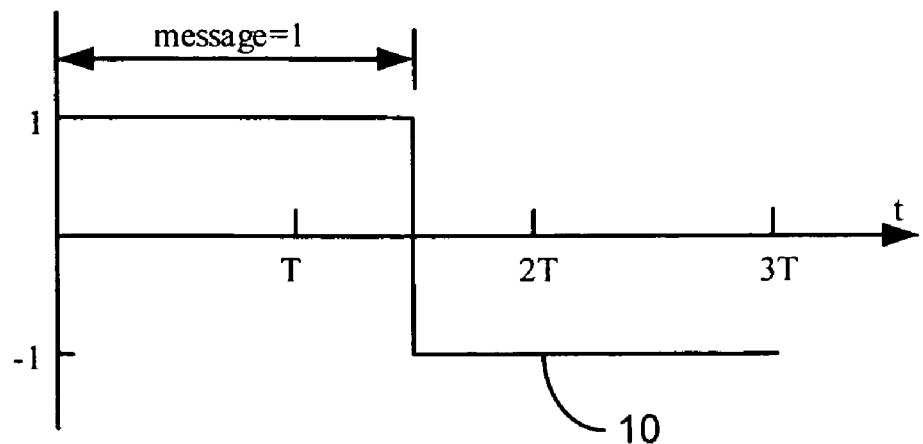

Similarly, FIG. 1B shows a transition of signal 10 occurring during the second interval leaving room for one message bit (assumed to be 1) in the first interval. It is noted that in order to establish a state transition, the waveform needs to be continued from the previous amplitude level. Hence, to allow waveforms to freely start at the beginning of every block which can also be stated as to start all blocks from state $S_0$, no state transitions are allowed during the last interval of any block in this example. However, when a transition occurs during the first interval of a block (as in FIG. 1A), the waveform cannot freely start as it requires knowledge of the last bit of the previous block, but those waveforms with transitions that occur during other intervals do not require any information from the previous block. Again, recall that no transitions are permitted during the last interval (2T to 3T) in this example in order to guarantee that there are no pulses having duration less than T. It is also noted that by inverting the waveforms of FIGS. 1A-1B, the prior signal level could be −1 rather than 1.

As previously noted, in accordance with the present embodiment no transitions are permitted during the last interval of any block of N intervals. However, as previously mentioned, in the alternative, no transitions could be permitted during the first interval of each block. This, of course, suggests that a different set of waveforms should be used.

For illustration, now consider an exemplary embodiment shown in FIG. 2 wherein all the waveforms (in this case sixteen in total) that can be generated along with the corresponding state transitions of a MILC scheme with N=3 and K=3, assuming the last amplitude level of the previous block is 1. If the last amplitude level of the previous block is −1, all waveforms corresponding to the state transitions $S_0 \rightarrow S_1$ and $S_0 \rightarrow S_2$ will be inverted. Again, recall that no transitions are permitted during the last interval (2T to 3T) in order to guarantee that there are no pulses having duration less than T.

Figure 2A:
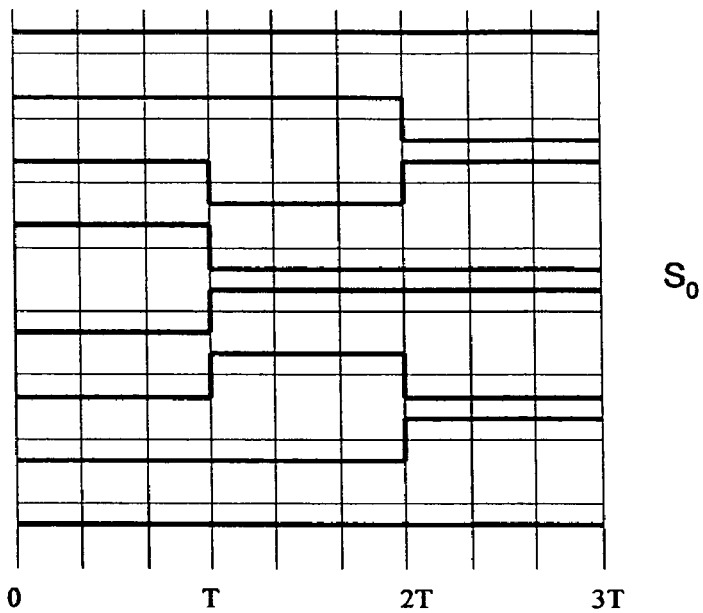
FIG. 2, is made up of FIG. 2A, FIG. 2B and FIG. 2C, shows all the waveforms that can be generated along with the corresponding state transitions of an exemplary Multi-Interval Line Coding (MILC) scheme with N=3 and K=3 consistent with certain embodiments of the present invention.

FIG. 2A shows all possible signal patterns which correspond to remaining in the initial state of $S_0$ (i.e., no transition to either state $S_1$ or $S_2$). In this example, this condition is characterized by there being no transitions in any of the signals at any time other than times T or 2T. This inherently satisfies the requirement that there be no pulses with duration less than T and also represents the eight basic waveforms one might expect to use for transmitting ordinary binary data using conventional techniques.

Figure 2B:
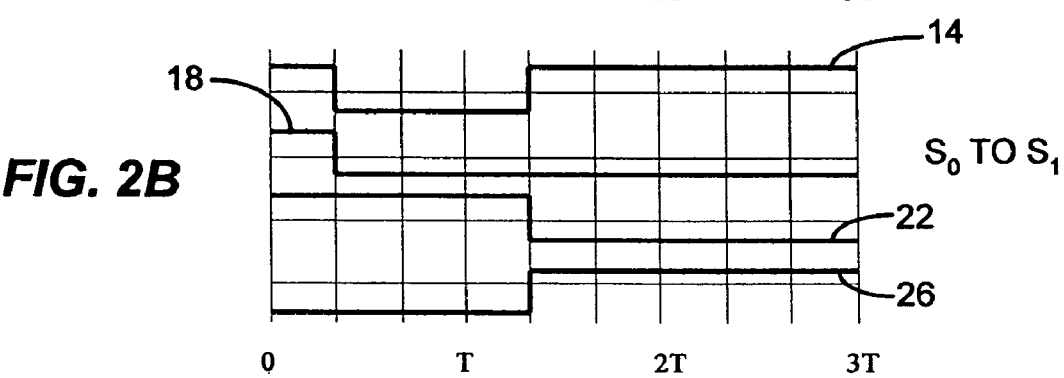

FIG. 2B shows four possible signal patterns which correspond to a transition from the initial state of $S_0$ to state $S_1$. In this example, this condition is characterized by there being transitions during the three intervals at T/3 or 4T/3 and no transitions at any other time. Signal patterns 14 and 18 exhibit transitions in the first sub-interval of the block (at times T/3) and can therefore only be used if the signal level from a prior block is at a +1 level. Signal patterns 22 and 26 do not exhibit a transition until after T (specifically, at 4T/3) and have no transition thereafter. Thus, signal patterns 22 and 26 can follow blocks having signal levels at either +1 or −1.

Figure 2C:
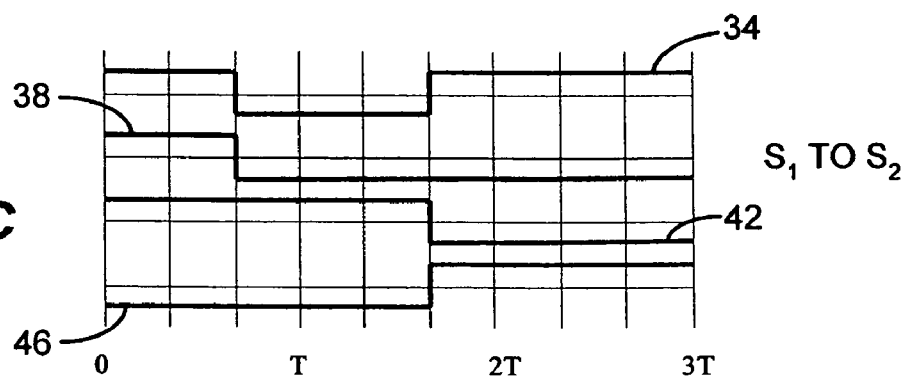

FIG. 2C shows all possible signals which correspond to a transition from the initial state of $S_0$ to state $S_2$. In this example, this condition is characterized by there being transitions during the three intervals at 2T/3 or 5T/3 and no transitions at any other time. Signal patterns 34 and 38 exhibit transitions in the first sub-interval of the block (at times T/3) and can therefore only be used if the signal level from a prior block is at a +1 level. Signal patterns 42 and 46 do not exhibit a transition until after T (specifically, at 4T/3) and have no transition thereafter. Thus, signal patterns 42 and 46 can follow blocks having signal levels at either +1 or −1. As in the prior example of FIG. 1 which also has N=3, no transitions are permitted during the last interval (2T to 3T) in order to guarantee that there are no pulses having duration less than T.

The selection of $2^L$ out of M waveforms, when $M \geq 2^L$, can be formulated as a separate problem. However, numerical results appear to indicate that a specific selection has little impact on the performance, and hence, in accordance with this exemplary embodiment, $2^L$ out of M waveforms have been randomly selected. This is because the minimum time separation between the waveforms remains the same regardless of the selection of the specific $2^L$ waveforms. As noted above, no attempt to optimize the selection of specific waveforms has been carried out since it appears to have little impact on performance. However, minor optimization in the performance based on the selection of specific waveforms may be possible and is contemplated in accordance with certain embodiments consistent with the present invention.

Thus, a method of encoding data, carried out on at least one of a hardware device and a computer executing a software program within, consistent with certain embodiments consistent with the present invention involves: for each time interval T, establishing K sub-intervals, where K is an integer greater than one; for each of N intervals of T seconds, transmitting one of M signal patterns each representing a message sequence, where $M > 2^N$; wherein, each of the M signal patterns has L bits and has transitions in signal levels separated by at least T; and wherein transitions in signal levels are permitted not only at integer multiples of the interval T, but also at times falling between the boundaries of the interval T at approximately the boundaries of the K sub-intervals. As those skilled in the art will realize, embodiments of the present invention may be implemented through one or more hardware devices alone, through a computer executing a software program within, or through both one or more hardware devices and a computer executing a software program within. This is true for process, decoder, encoder, signal, and other embodiments of the present invention.

Another coding method, carried out on at least one of a hardware device and a computer implementing a programmed process, consistent with certain embodiments consistent with the present invention, involves: selecting a value of N and a value of K, where N=number of intervals used to transmit M distinct signal patterns and K=the number of sub-intervals assigned per interval T; assigning K sub-intervals to each interval T; choosing a number of state transitions to be allowed within each NT interval, wherein transitions are permitted at integer multiples of T/K for each interval; computing a number of waveforms M that can be transmitted over N intervals, wherein no transitions are permitted in one of the first and last intervals in each N intervals; selecting a set of waveforms of length L such that $M \geq 2^L$, where M=number of waveforms or signal patterns that can be transmitted over N intervals; and mapping a set of M message sequences to the M waveforms.

Selection of Attractive MILC Schemes

Certain of the MILC schemes (combinations of M, N and K) may be more attractive for practical application than others by virtue of maximization of the amount of data that can be throughput in a particular application. Attractive MILC schemes can be found by calculating the number of waveforms M at various values of N and K and looking for those schemes that maximize data throughput. One can calculate M by solving the combinatorial problem using waveforms generated by all possible state transitions. The following observations can be made related to a MILC scheme that has K states with a block of length N to assist the calculation of M.

1. As in ordinary binary signaling, the number of waveforms $M_0$ generated by keeping the scheme at state $S_0$ over the entire block with zero transitions is $$M_0 = 2^N. \quad (2)$$

2. The number of waveforms $M_1$ generated by making one specific state transition from state $S_0$ to $S_i(i=1,2,\ldots(K-1))$ is $2^{(N-2)}$. Further, over the entire block, there are (N−1) different possible intervals that the state transitions from $S_0$ to the same $S_i$ can occur. Hence, the total number of distinct waveforms with one state transition is given by $$M_1 = (K-1)(N-1)2^{(N-2)} \text{ when } N \geq 2, K \geq 2, \quad (3)$$

and $M_1 = 0$ when $N \leq 2$ or $K=1$. For example, when N=K=3, 8 waveforms are generated according to (2) by staying at state $S_0$, and 8 more waveforms are generated according to (3) from the state transitions $S_0 \to S_1$ and $S_0 \to S_2$, as shown in FIGS. 2B-2C.

3. The number of waveforms generated with a specific 2 state transition of the form $S_0 \to S_i \to S_0$ is $2^{(N-3)}$. Noticing that there are $$\binom{N-1}{2}$$

different ways to have the same transitions within the block and the number of different such state transitions is (K−1), the number of waveforms $M_{2a}$ generated with 2 such state transitions is $$M_{2a} = \binom{N-1}{2}(K-1)2^{(N-3)} \text{ when } N \geq 3, K \geq 2. \quad (4)$$

The number of waveforms generated with state transitions of the form $S_0 \to S_i \to S_j$ with j>i can be similarly found by noticing that the number of different such state transitions is given by $$\left(\sum_{i=1}^{K-2}\sum_{j=i+1}^{K-1} 1\right) = (K-1)(K-2)/2.$$

Hence, the number of waveforms $M_{2b}$ generated under the above set of state transitions is $$M_{2b} = \binom{N-1}{2}\frac{(K-1)(K-2)}{2}2^{(N-3)} \text{ when } N \geq 3, K \geq 3. \quad (5)$$

Similarly, the number of waveforms $M_{2c}$ generated by considering 2 state transitions of the form $S_0 \to S_i \to S_j$ with, i>j 0, can be written as $$M_{2c} = \binom{N-2}{2}\frac{(K-1)(K-2)}{2}2^{(N-4)}, \text{ when } N \geq 4, K \geq 3 \quad (6)$$

4. Extending the above method, the number of waveforms $M_{3a}$ generated with 3 state transitions of the form $S_0 \to S_i \to S_j \to S_0$ with i<j can be written as $$M_{3a} = \binom{N-1}{3}\left(\sum_{i=1}^{K-2}\sum_{j=i+1}^{K-1} 1\right)2^{(N-4)} \quad (7)$$

$$= \binom{N-1}{3}\frac{(K-1)(K-2)}{2}2^{(N-4)} \text{ when } N \geq 4, K \geq 3,$$

and the number of waveforms $M_{3b}$ with the state transitions of the form $S_0 \to S_i \to S_j \to S_0$ with i>j is given by $$M_{3b} = \binom{N-2}{3}\left(\sum_{i=2}^{K-1}\sum_{j=1}^{i-1} 1\right)2^{(N-5)} \quad (8)$$

$$= \binom{N-2}{3}\frac{(K-1)(K-2)}{2}2^{(N-5)} \text{ when } N \geq 5, K \geq 3,$$

Similarly, the number of waveforms $M_{3c}$ generated with 3 state transitions of the form $S_0 \to S_i \to S_j \to S_k$ with i<j<k is given by $$M_{3c} = \binom{N-1}{3}\left(\sum_{i=1}^{K-3}\sum_{j=i+1}^{K-2}\sum_{k=j+1}^{K-1} 1\right)2^{(N-4)} \quad (9)$$

$$= \frac{(K-1)(K-2)(K-3)}{6}\binom{N-1}{3}2^{(N-4)} \text{ when } N \geq 4, K \geq 4,$$

the number of waveforms $M_{3d}$ generated by the state transitions of the form $S_0 \to S_i \to s_j \to S_k$ with i<j and j>k 0 is given by $$M_{3d} = \binom{N-2}{3}\left(\sum_{i=1}^{K-2}\sum_{j=i+1}^{K-1}\sum_{k=1}^{j-1} 1\right) 2^{(N-5)} \quad (10)$$

$$= \frac{(K-1)(K-2)(2K-3)}{6}\binom{N-2}{3} 2^{(N-5)} \text{ when } N \geq 5, K \geq 3,$$

the number of waveforms $M_{3e}$ generated by the state transitions of the form $S_0 \to S_i \to S_j \to S_k$ with i>j and k>j is given by $$M_{3e} = \binom{N-2}{3}\left(\sum_{i=1}^{K-1}\sum_{j=0}^{i-1}\sum_{k=j+1}^{K-1} 1\right) 2^{(N-5)} \quad (11)$$

$$= \frac{K(K-1)(2K-1)}{6}\binom{N-2}{3} 2^{(N-5)} \text{ when } N \geq 5, K \geq 2,$$

and the number of waveforms $M_{3f}$ generated by the state transitions of the form $S_0 \to S_i \to S_j \to S_k$ with i>j>k is given by $$M_{3f} = \binom{N-3}{3}\left(\sum_{i=3}^{K-1}\sum_{j=2}^{i-1}\sum_{k=1}^{j-1} 1\right) 2^{(N-6)} \quad (12)$$

$$= \frac{(K-1)(K-2)(K-3)}{6}\binom{N-3}{3} 2^{(N-6)}$$

when $N \geq 6, K \geq 4$.

It is seen from the above observations that the proposed MILC scheme can be useful for block lengths $N \geq 3$. Recalling that the receiver makes a decision in favor of one of the $2^L$ sequences in every block and since L increases with N, in order to limit the complexity, an analysis of schemes with $L \leq 11$ and block lengths $3 \leq N \leq 6$ can be done. The computation of M at N=6, should also consider the waveforms generated in following cases with four state transitions:

5. The number of waveforms $M_{4a}$ generated by the state transitions of the form $S_0 \to S_i \to S_j \to S_k \to S_0$ with i<j<k is $$M_{4a} = \binom{N-1}{4}\left(\sum_{i=1}^{K-3}\sum_{j=i+1}^{K-2}\sum_{k=j+1}^{K-1} 1\right) 2^{(N-5)} \quad (13)$$

$$= \frac{(K-1)(K-2)(K-3)}{6}\binom{N-1}{4} 2^{(N-5)}$$

when $N \geq 5, K \geq 4$.

6. The number of waveforms $M_{4b}$ generated by the state transitions of the form $S_0 \to S_i \to S_j \to S_k \to S_r$ with i<j<k<r is $$M_{4b} = \binom{N-1}{4}\left(\sum_{i=1}^{K-4}\sum_{j=i+1}^{K-3}\sum_{k=j+1}^{K-2}\sum_{r=k+1}^{K-1} 1\right) 2^{(N-5)} \quad (14)$$

$$= \frac{(K-1)(K-2)(K-3)(K-4)}{24}\binom{N-1}{4} 2^{(N-5)}$$

when $N \geq 5, K \geq 5$.

It is noted here that all values in (3)-(5) and (7)-(13) are zero if the conditions on N and K are not satisfied. Using above expressions, we can calculate the number of waveforms M for block lengths N=3,4,5 and 6 at any number of states K. For example, when N=3 and K=3, it follows from (1) and (2) that $M=M_0+M_1=16$, and hence L=4. Similarly, when N=5 and K=4, $M=M_0+M_1+M_{2a}+M_{2b}+M_{2c}+M_{3a}+M_{3c}=340$ and L=8. TABLE I lists the values of M calculated using the above expressions for N=3,4,5 and 6, and K=2,3,4 and 5. The present concept can be extended to even higher order schemes with larger values of N and K, as will be appreciated by those skilled in the art upon consideration of the present teachings. Such higher order schemes are contemplated by certain embodiments consistent with the present invention.

Schemes with attractive L/N ratio ($I_1$ through $I_9$) and their corresponding values of L are also marked in TABLE I. These schemes are considered attractive for purposes of this document because large values of L/N translate to a higher data transmission rate.

TABLE I

VALUES OF M OF MILC SCHEMES

| | K = 2 | K = 3 | K = 4 | K = 5 |
|---|---|---|---|---|
| N = 3 | 13 | 19 ($I_1$, L = 4) | 26 | 34 |
| N = 4 | 34 ($I_2$, L = 5) | 60 | 95 ($I_3$, L = 6) | 138 |
| N = 5 | 89 | 189 ($I_4$, L = 7) | 345 ($I_5$, L = 8) | 571 ($I_6$, L = 9) |
| N = 6 | 232 | 584 ($I_7$, L = 9) | 1202 ($I_8$, L = 10) | 2118 ($I_9$, L = 11) |

The waveforms of a MILC scheme can be represented by binary sequences of length KN using the binary value of the waveform in each sub-interval. For example, TABLE II lists the binary representations, $C_i$(i=1,2, . . . 16), of all 16 waveforms of scheme, $I_1$ assuming the last level of the previous block is 1. If the last amplitude level of the previous block is −1, the waveforms represented by $C_2$, $C_3$, $C_{14}$ and $C_{15}$ will be changed to (0 1 1 1 1 1 1 1 1),(0 0 1 1 1 1 1 1 1),(0 1 1 1 0 0 0 0 0)and(0 0 1 1 1 0 0 0 0). It is noted here that all binary representations are in natural binary whereas the actual waveforms are in bipolar format.

TABLE II

WAVEFORMS OF SCHEME $I_1$

| Waveform | Binary Representations | Message Sequence |
|---|---|---|
| 1 | $C_1$ (0 0 0 0 0 0 0 0 0) | $u_1$ (0 0 0 0) |
| 2 | $C_2$ (1 0 0 0 0 0 0 0 0) | $u_2$ (0 0 0 1) |

TABLE II-continued

WAVEFORMS OF SCHEME $I_1$

| Waveform | Binary Representations | Message Sequence |
|---|---|---|
| 3 | $C_3$ (1 1 0 0 0 0 0 0) | $u_3$ (0 0 1 1) |
| 4 | $C_4$ (1 1 1 0 0 0 0 0) | $u_4$ (0 0 1 0) |
| 5 | $C_5$ (1 1 1 1 0 0 0 0) | $u_5$ (0 1 1 0) |
| 6 | $C_6$ (1 1 1 1 1 0 0 0) | $u_6$ (0 1 1 1) |
| 7 | $C_7$ (1 1 1 1 1 1 0 0) | $u_7$ (0 1 0 1) |
| 8 | $C_8$ (1 1 1 1 1 1 1 1) | $u_8$ (0 1 0 0) |
| 9 | $C_9$ (1 1 1 0 0 0 1 1) | $u_9$ (1 1 0 0) |
| 10 | $C_{10}$ (0 0 0 1 1 1 1 1) | $u_{10}$ (1 1 0 1) |
| 11 | $C_{11}$ (0 0 0 0 1 1 1 1) | $u_{11}$ (1 1 1 1) |
| 12 | $C_{12}$ (0 0 0 0 0 1 1 1) | $u_{12}$ (1 1 1 0) |
| 13 | $C_{13}$ (0 0 0 0 0 0 1 1) | $u_{13}$ (1 0 1 0) |
| 14 | $C_{14}$ (1 0 0 0 1 1 1 1) | $u_{14}$ (1 0 1 1) |
| 15 | $C_{15}$ (1 1 0 0 0 1 1 1) | $u_{15}$ (1 0 0 1) |
| 16 | $C_{16}$ (0 0 0 1 1 1 0 0 0) | $u_{16}$ (1 0 0 0) |

The waveforms are mapped onto $2^L$ message sequences $u_i(i=1,2,\ldots 2^L)$ to minimize the bit error probability. This can be done, for example, by using Gray coding [see, for example, J. B. Proakis, "*Digital Communications*", McGraw Hill, Inc. Fourth Edition, 2001; and J. M. Wozencraft, and I. M. Jacobs, "*Principles of Communication Engineering*", John Wiley and Sons, Inc., 1965 Waveland Press, Inc., 1990] and ensuring that the assigned message sequences corresponding to two waveforms that are separated by the minimum distance differ by a minimum number of bits. In general, MILC signals can have more than two waveforms at the same minimum distance from a waveform. Therefore, it may not be generally possible to have a single bit separation between all message sequences that have waveforms separated by the minimum time separation of T/K. For example, TABLE II lists a possible assignment of message sequences $u_i(i=1,2,\ldots 16)$ in scheme $I_1$ using a Gray code. It is noted that all pairs of message sequences that have waveforms separated by the minimum distance differ by only one bit. A similar listing for $I_2$ is given in TABLE III, and similar tables can be developed using the present teachings for other MILC schemes.

TABLE III

WAVEFORMS OF SCHEME $I_2$

| Waveform | Binary Representations | Message Sequence |
|---|---|---|
| 1 | $C_1$ = (1 1 1 1 1 1 1 1) | $u_1$ = (0 0 1 0 0) |
| 2 | $C_2$ = (1 1 1 1 1 1 0 0) | $u_2$ = (0 0 1 0 1) |
| 3 | $C_3$ = (1 1 1 1 0 0 1 1) | $u_3$ = (1 1 0 0 0) |
| 4 | $C_4$ = (1 1 1 1 0 0 0 0) | $u_4$ = (0 0 1 1 0) |
| 5 | $C_5$ = (1 1 0 0 1 1 1 1) | $u_5$ = (1 0 0 1 1) |
| 6 | $C_6$ = (1 1 0 0 1 1 0 0) | $u_6$ = (1 0 0 1 0) |
| 7 | $C_7$ = (1 1 0 0 0 0 1 1) | $u_7$ = (0 1 0 0 1) |
| 8 | $C_8$ = (1 1 0 0 0 0 0 0) | $u_8$ = (0 0 0 1 1) |
| 9 | $C_9$ = (0 0 1 1 1 1 1 1) | $u_9$ = (0 1 1 0 0) |
| 10 | $C_{10}$ = (0 0 1 1 1 1 0 0) | $u_{10}$ = (1 1 0 1 0) |
| 11 | $C_{11}$ = (0 0 1 1 0 0 1 1) | $u_{11}$ = (1 0 1 0 0) |
| 12 | $C_{12}$ = (0 0 1 1 0 0 0 0) | $u_{12}$ = (1 1 0 0 1) |
| 13 | $C_{13}$ = (0 0 0 0 1 1 1 1) | $u_{13}$ = (0 1 1 1 1) |
| 14 | $C_{14}$ = (0 0 0 0 1 1 0 0) | $U_{14}$ = (1 1 1 0 0) |
| 15 | $C_{15}$ = (0 0 0 0 0 0 1 1) | $u_{15}$ = (0 1 0 1 0) |
| 16 | $C_{16}$ = (0 0 0 0 0 0 0 0) | $u_{16}$ = (0 0 0 0 0) |
| 17 | $C_{17}$ = (1 0 0 1 1 1 1 1) | $u_{17}$ = (1 0 1 0 1) |
| 18 | $C_{18}$ = (1 0 0 1 1 1 1 1) | $u_{18}$ = (1 1 1 0 1) |
| 19 | $C_{19}$ = (1 0 0 0 0 0 0 0) | $u_{19}$ = (0 0 0 0 1) |
| 20 | $C_{20}$ = (1 0 0 0 1 1 1 1) | $U_{20}$ = (1 1 1 1 1) |
| 21 | $C_{21}$ = (1 1 1 0 0 1 1 1) | $u_{21}$ = (1 0 0 0 0) |
| 22 | $C_{22}$ = (1 1 1 1 0 0 0 0) | $u_{22}$ = (0 0 0 1 0) |
| 23 | $C_{23}$ = (0 0 0 1 1 1 1 1) | $u_{23}$ = (0 1 1 0 1) |
| 24 | $C_{24}$ = (1 1 0 0 0 1 1 1) | $u_{24}$ = (1 0 0 0 1) |
| 25 | $C_{25}$ = (1 1 1 1 1 0 0 0) | $u_{25}$ = (0 0 1 1 1) |

TABLE III-continued

WAVEFORMS OF SCHEME $I_2$

| Waveform | Binary Representations | Message Sequence |
|---|---|---|
| 26 | $C_{26}$ = (0 0 1 1 1 0 0 0) | $u_{26}$ = (1 1 0 1 1) |
| 27 | $C_{27}$ = (0 0 0 0 0 1 1 1) | $u_{27}$ = (0 1 1 1 0) |
| 28 | $C_{28}$ = (1 0 0 0 0 1 1 1) | $u_{28}$ = (1 1 1 1 0) |
| 29 | $C_{29}$ = (1 0 0 0 1 1 0 0) | $u_{29}$ = (1 0 1 1 0) |
| 30 | $C_{30}$ = (1 1 1 1 0 0 1 1) | $u_{30}$ = (0 1 1 0 0) |
| 31 | $C_{31}$ = (1 0 0 1 1 1 0 0) | $u_{31}$ = (1 0 1 1 1) |
| 32 | $C_{32}$ = (1 0 0 0 0 0 1 1) | $u_{32}$ = (0 1 0 1 1) |

Figure 3:
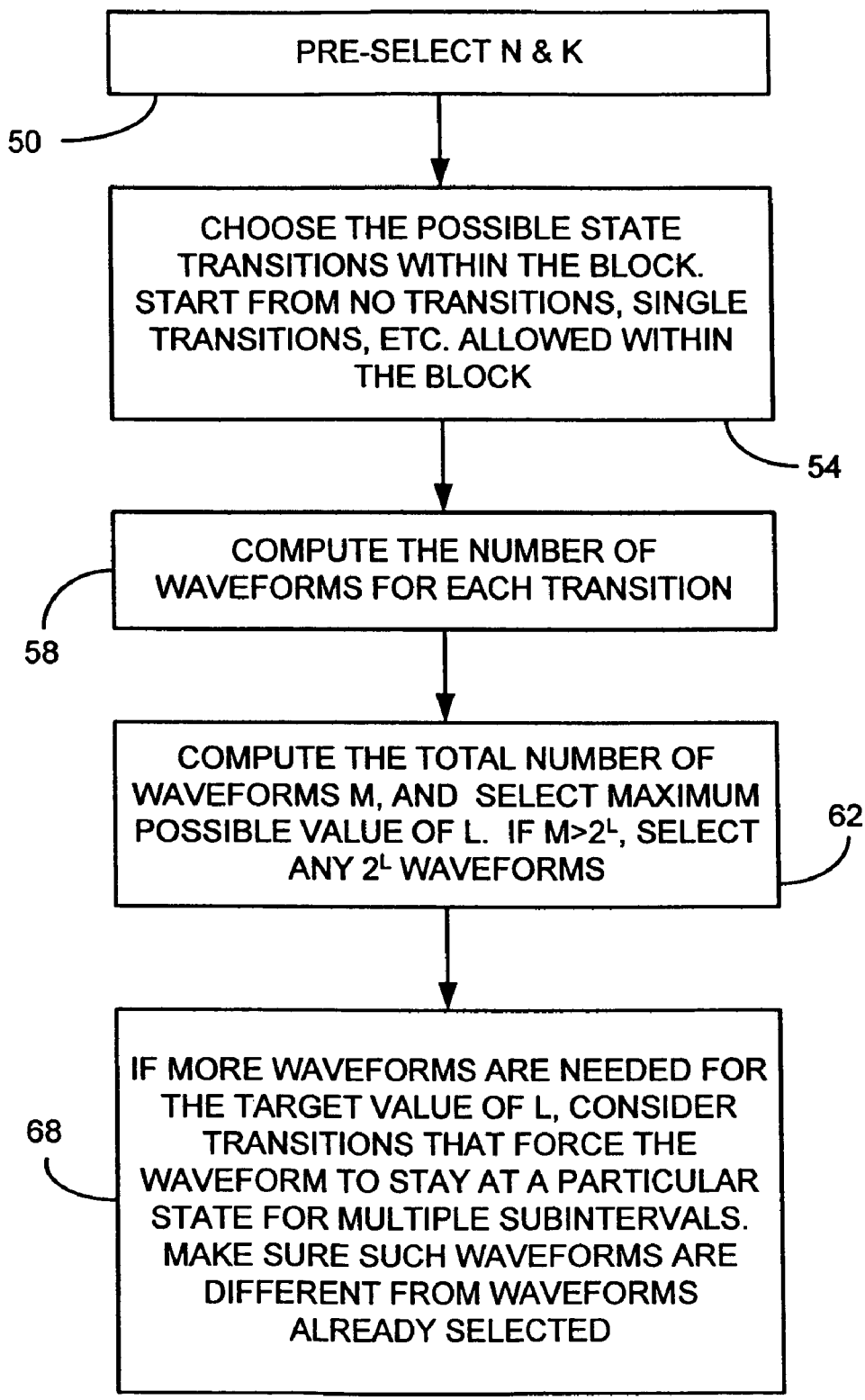
FIG. 3 is a flow chart of an MILC coding process consistent with certain embodiments of the present invention.

The MILC coding process is illustrated in flow chart form in FIG. 3, and starts with pre-selection of values of N and K at 50. At 54, the possible state transitions within a block are chosen, starting with no transitions, then progressing through single transitions, etc. that are to be allowed within the block. At 58, a number of waveforms is computed for each transition. At 68, the maximum number L of possible waveforms is selected such that $M \geq 2^L$. Any set of $2^L$ waveforms are then selected. If, at 62, more waveforms are needed for the target value of L, transitions that force the waveform to stay at a particular state for multiple subintervals are considered, and further waveforms can be selected which are different from the ones already selected.

Detection of MILC Signals

Figure 4:
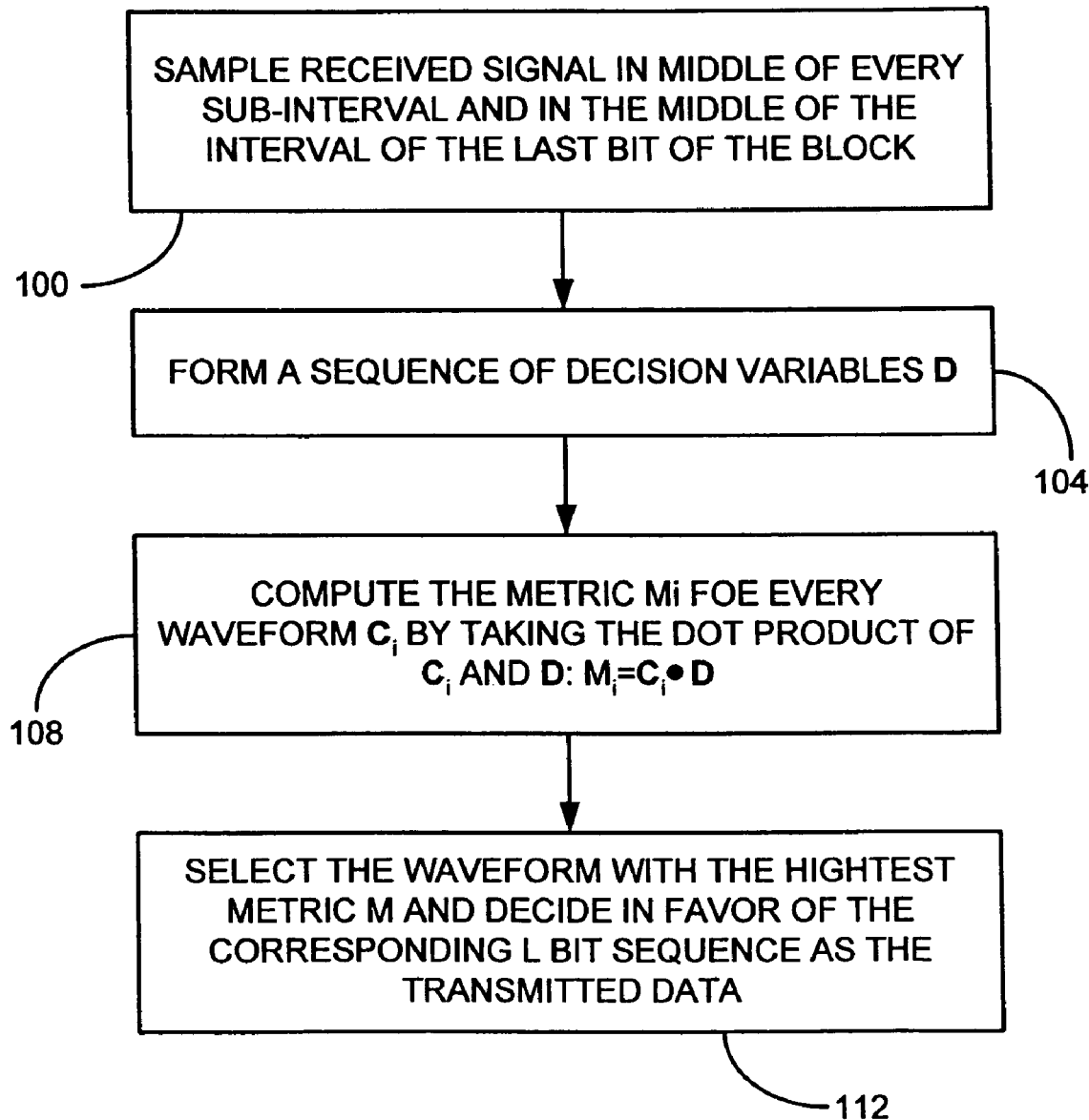
FIG. 4 is a flow chart of an MILC decoding process consistent with certain embodiments of the present invention.

The MILC decoding process is described by the flow chart of FIG. 4, wherein a received signal is sampled at about the center of each sub-interval and at about the middle of the interval for the last interval of the block at 100. A sequence of decision variables D can then be formed at 104, as will be described in detail later. At 108 the metric $M_i$ is computed for every waveform $C_i$ by taking the dot product of $C_i$ and D. At 112, the waveform with the highest metric $M_i$ is selected as the most likely received signal, and the corresponding L bit sequence is selected by reference to a lookup table as the transmitted data sequence.

The receiver detects the waveform transmitted in every block by using the decision variables during different time durations of the current block and that during the last interval of the previous block and making a soft decision on the waveform. These decision variables can be obtained by sampling the received signal at or near the middle of every sub-interval (or at least at some point between allowed transition times), and at or near the middle of the interval in case of the last interval. Since there are no transitions during the last interval (zero sub-intervals), the sequence of decision variables, D, is formed by repeating the decision variable of the last interval K times along with the decision variables from other sub-intervals. Thus, the decision variable D is a vector made up of KN sampled values of the received signal in a block. (For illustrative purposes, the center point of each sub-interval is presumed to be the optimal point for sampling the signal, however, those skilled in the art may find that sampling the signal at other points between the boundaries of the sub-interval may be optimal. Thus, although the present description calls for sampling at or near the middle, any point between the two end points might turn out to be more optimal in practice and should be considered equivalent to the "middle" for purposes of this description.)

Since the waveform in any current block depends on the last bit of the previous block, the most likely waveform in the current block is found by using the decision variables of the current block and that of the last bit of the previous block, and searching among all possible $2^{(L+1)}$ waveforms allowing the last bit of the previous block to be 1 or −1. Hence, the decision variable sequence used for the detection of any block can be expressed as $$D = (D_{lp}, D_{lp}, \ldots, D_{lp}, D_1, D_2, \ldots, D_{K(N-1)}, \\ D_{lc}, D_{lc}, \ldots, D_{lc}) \quad (15)$$

where, $D_{lp}$ and $D_{lc}$, each of which are repeated K times in vector D, are the decision variables during the last interval of the previous and current blocks respectively. A metric $M_i$ is found for every i th waveform as the following dot product $$M_i = C_i \cdot D$$

so that $$M_i = K(D_{lp} c_{i,lp} + D_{lc} c_{i,lc}) + \sum_{t=1}^{K(N-1)} c_{i,t} D_t \quad (16)$$

where, $$C_i = (c_{i,lp}, c_{i,lp}, \ldots, c_{i,lp}, c_{i,1}, c_{i,2}, \ldots, c_{i,K(N-1)}, c_{i,lc}, c_{i,lc}, \ldots, c_{i,lc}) \quad (17)$$

is the binary representation of the i th waveform starting from the last bit of the previous block up to the end of the current block, and $c_{i,lp}$ and $C_{i,lc}$, each of which is repeated K times in vector $C_i$, are the binary representations of the last bit of the previous and current blocks of the i th waveform respectively. The receiver makes a decision in favor of the waveform with the highest metric.

The present scheme is used to detect symbol voltage (or other signal level) at each sub interval. This potentially implies use of a clock that is K times faster than the clock for binary case, f=1/T (where K is the number of sub intervals). However, multi-phase clocks [see for example, K. Yamaguchi, M. Fukaishi, T. Sakamoto, N. Akiyama, and K. Nakamura, "A 2.5-GHz Four-Phase Clock Generator with Scalable No-Feedback-Loop Architecture," IEEE J. Solid-State Circuits, vol. 36, pp. 1666-1672, November 2001; T. Saeki, M. Mitsuishi, H. Iwaki, M. Tagishi, "A 1.3-Cycle Lock Time, Non-PLL/DLL Clock Multiplier Based on Direct Clock Cycle Interpolation for Clock on Demand", IEEE J. Solid-State circuits, vol. 35, pp. 1581-1590, November 2000; B. W. Garlepp, K. S. Donnelly, J. Kim, P. S. Chau, J. L. Zerbe, C. Huang, C. V. Tran, C. L. Portmann, D. Stark, Y. Chan, T. H. Lee, and M. A. Horowitz "A Portable Digital DLL for High-Speed CMOS Interface Circuits", IEEE J. Solid-State circuits, vol. 34, pp. 632-644, May 1999; L. Yang and J. Yuan, "An Arbitrarily Skewable Multiphase Clock Generator Combining Direct Interpolation With Phase Error Average", Proceedings of International Symposium on Circuits and Systems, vol. 1, pp. 25-28, May 2003] can be used so that the clock frequency is the same as the original binary case, as illustrated in FIG. 5. FIG. 5A illustrates a simple binary clock signal 140. FIG. 5B illustrates a four phase clock signal having four clock signals 142, 144, 146 and 148, each separated by approximately 90 degrees. These clocks can be used at a decoder to select the times in which the input waveform is to be sampled. A similar clock can be used at the encoding side to establish transition times for the output signal pattern. Here the rising edge of the clocks 42, 44, 46 and 48 are used to sample the data. As a result, the hardware limitation in terms of clock frequency is the same as the original binary case. The additional cost lies in the generation of multi-phase clocks.

Thus, a method of decoding data, carried out on at least one of a hardware device and a computer implementing a software program, consistent with certain embodiments involves: receiving a digital data signal having one of M signal patterns of L bits spanning K sub-intervals of an interval T, where K is an integer greater than one; wherein the K sub-intervals span N intervals of T seconds each, and where M>$2^N$; wherein transitions in signal levels occur not only at integer multiples of the interval T, but also at times falling between the boundaries of the interval T at approximately the boundaries of the K sub-intervals; and mapping the received digital data signal to one of the M signal patterns to recover one of M message sequences.

A decoding process, carried out on at least one of a hardware device and a computer implementing a software program, consistent with certain embodiments involves: receiving an L bit waveform $C_i$, wherein the received waveform represents a sequence of bits arranged in a pattern that spans a plurality of N intervals of duration T, with each interval being divided into K subintervals; wherein no transitions are permitted during either the first or last interval; sampling the waveform during each sub-interval, and during the interval in which no transitions are permitted; forming a sequence of decision variables D made up of a binary representation of the sampled waveform; computing a metric $M_i$ for waveform $C_i$ by taking the dot product of $C_i$ and D; selecting a waveform with the highest metric $M_i$ as a most likely received signal; and mapping a corresponding L bit sequence to one of M message sequences, where $M \geq 2^L$.

Performance Analysis and Discussion

Figure 6A:
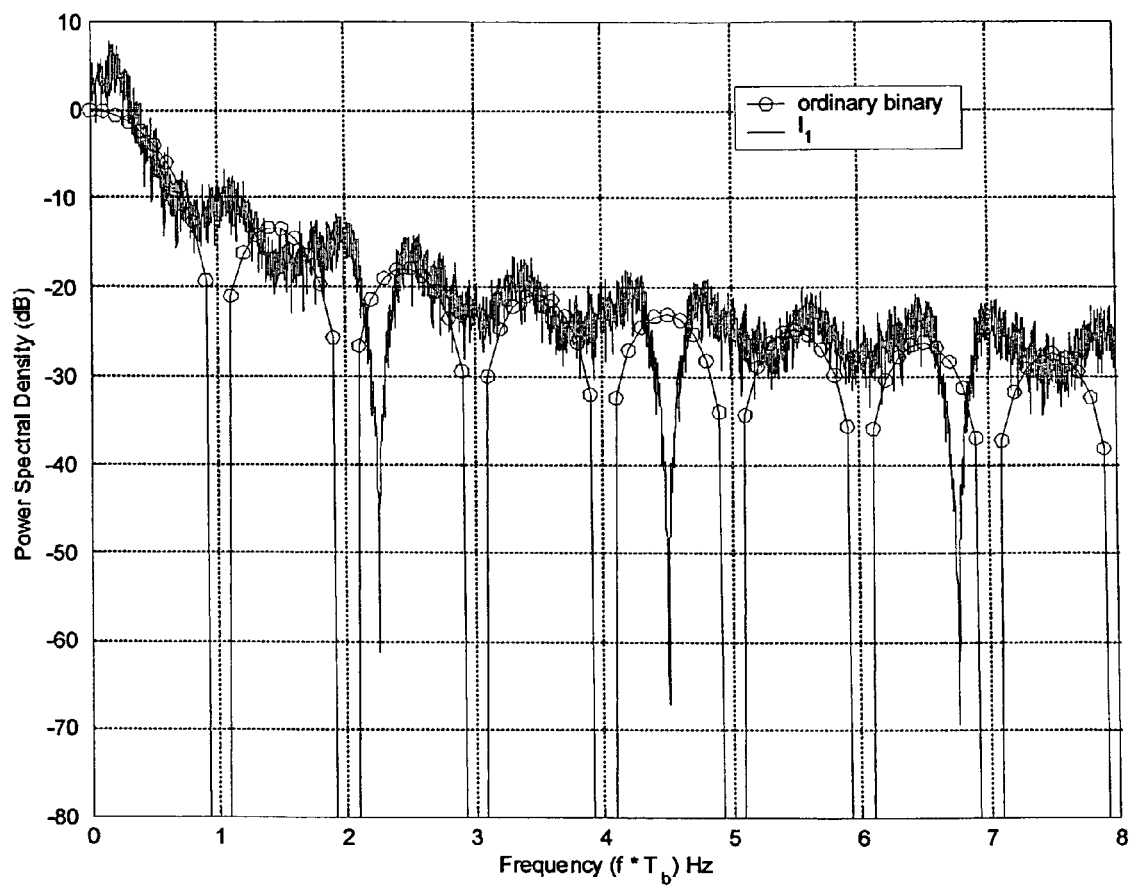
Figure 6B:
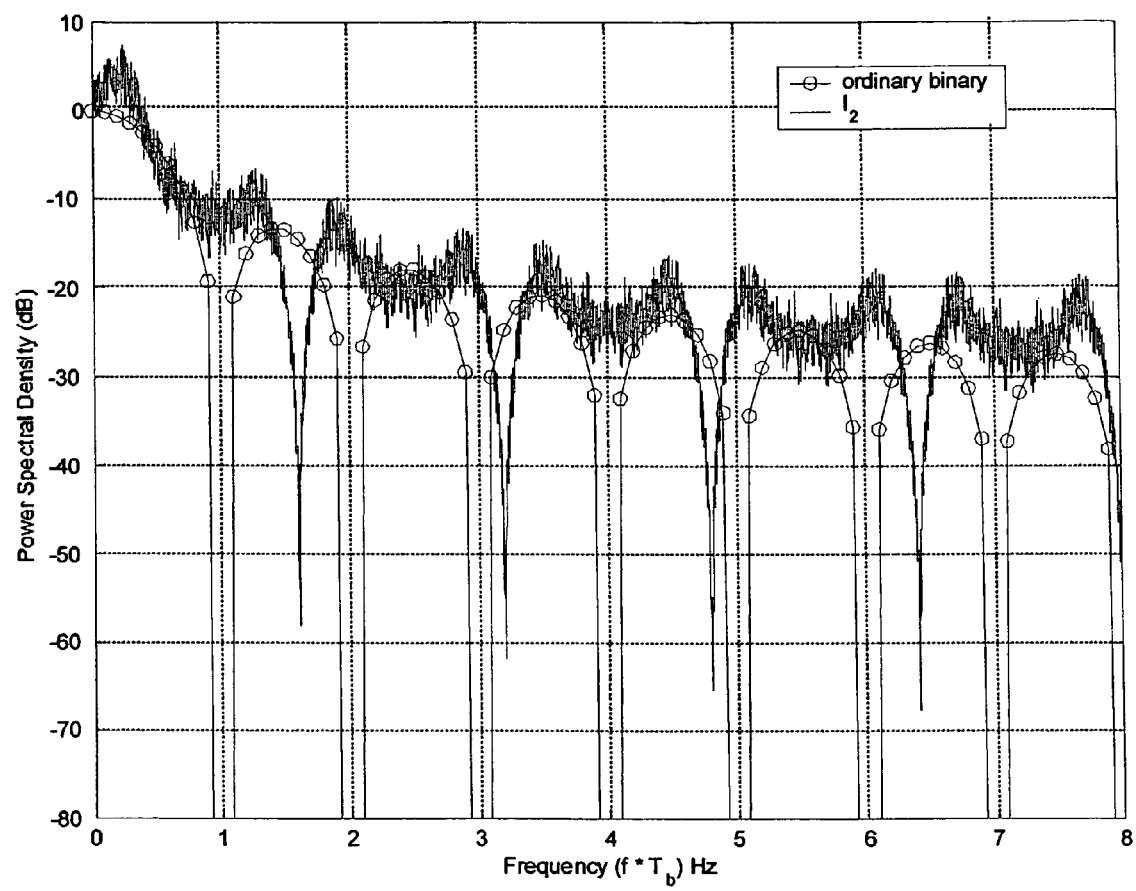
FIG. 6B shows the same data for $I_2$ consistent with certain embodiments of the present invention.
Figure 7:
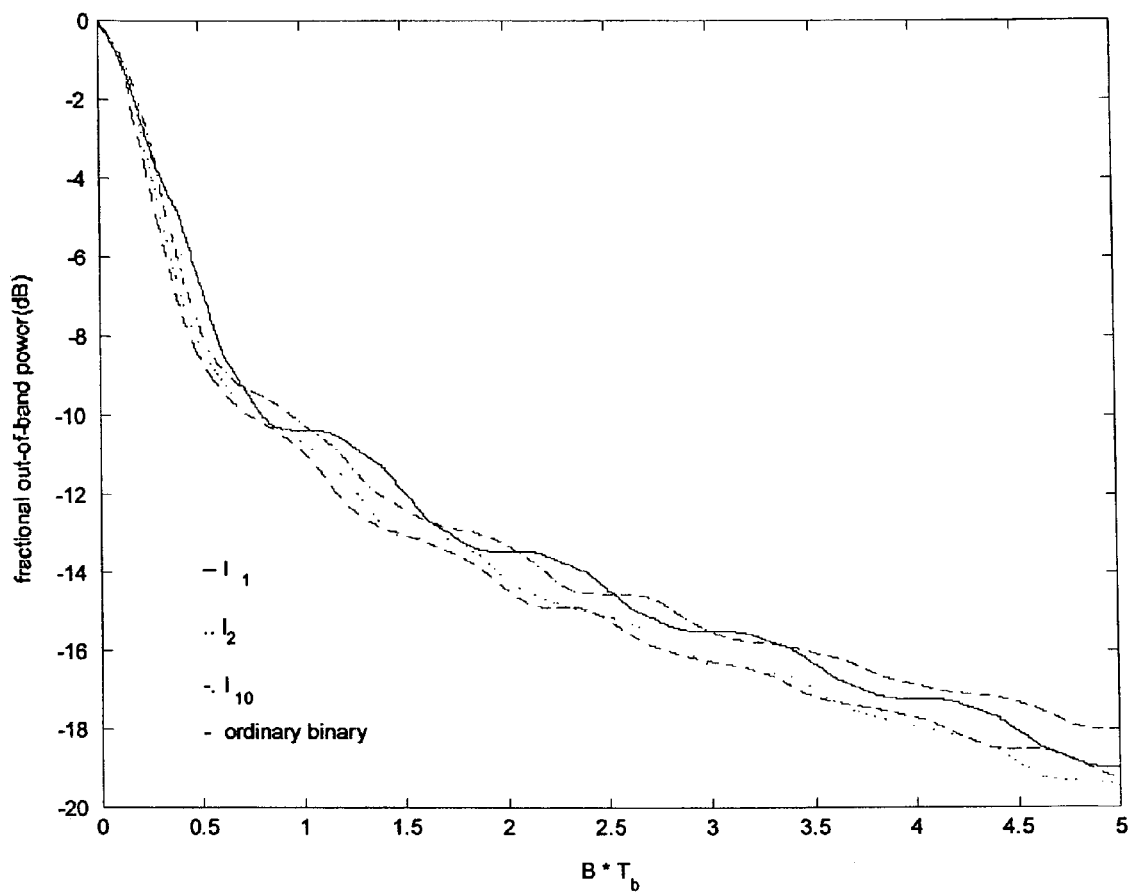
FIG. 7 is a graph showing that the bandwidth of MILC signals consistent with certain embodiments of the present invention can be smaller than that of ordinary binary.

The MILC schemes, $I_1$ and $I_2$ listed in TABLE I, are analyzed below and compared with ordinary binary signaling. First consider the power spectral density (psd) variation, S(f), of these selected schemes. FIG. 6A shows the simulated psd variations plotted with frequencies normalized to the average transmitted bit rate $1/T_b$ for the case of $I_1$, while FIG. 6B shows the same data for $I_2$. For MILC signals, due to the increase in information rate, $1/T_b=(L/N)1/T$. For comparison, the psd of ordinary binary signals given by $$S(f) = \left( \frac{\sin \pi f T_b}{\pi f T_g} \right)^2 \quad (18)$$

is also plotted in FIG. 6A and FIG. 6B. In order to demonstrate the spectral roll-off, FIG. 7 shows the fractional out-of-band power variation $$S_{ob}(B) = \frac{\int_{-\infty}^{\infty} S(f) df - \int_{-B}^{B} S(f) df}{\int_{-\infty}^{\infty} S(f) df} \quad (19)$$

of all schemes. It is seen from FIGS. 6A, 6B and 7 that MILC signals have comparable spectral variations with ordinary binary signals. In fact, it is seen from FIG. 7 that the bandwidth of MILC signals can be even smaller than that of ordinary binary signals at different levels of out-of-band power.

Figure 8:
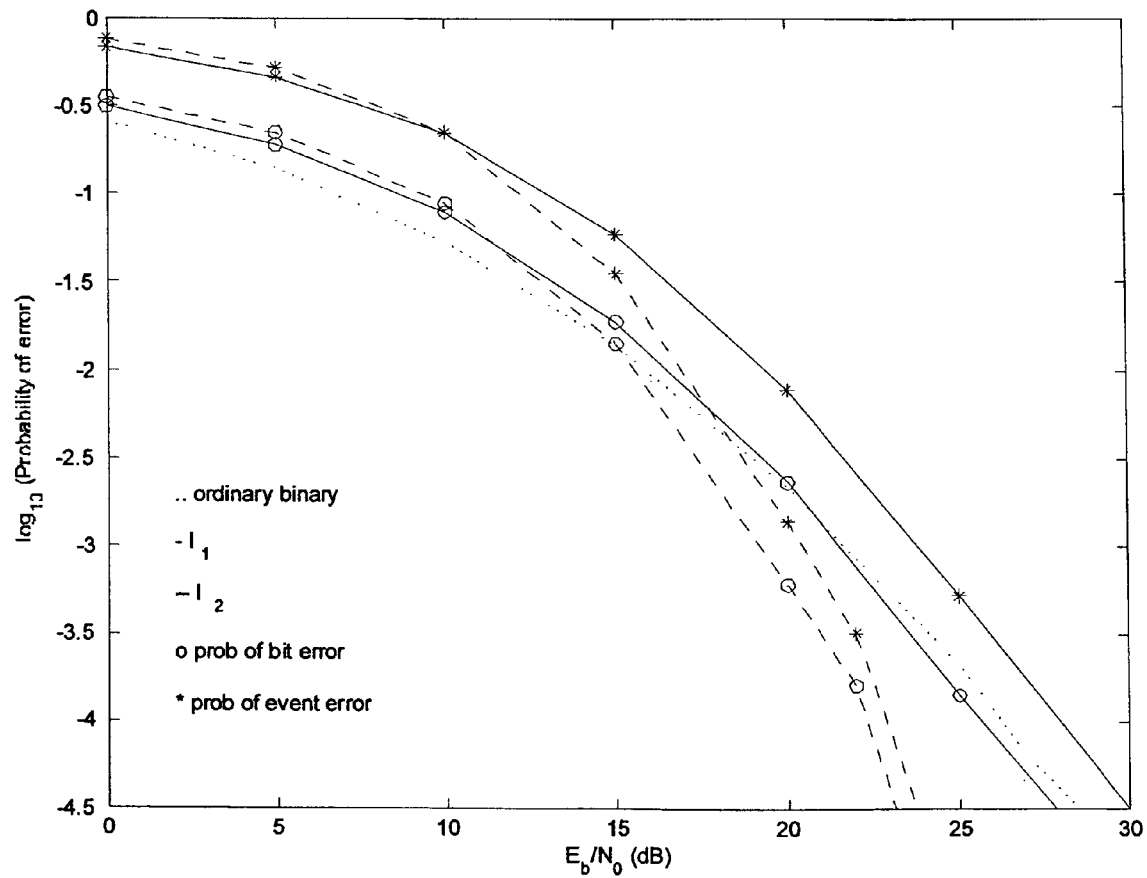
FIG. 8 shows the simulated variations of the event error probability for data transmission consistent with certain embodiments of the present invention.

The selected schemes are analyzed over a printed circuit board (PCB) trace with the channel loss modeled according to (1), with the corresponding coefficients $h_s$=0.021994923/m $\sqrt{MHz}$ and $h_d$=0.0007316368/mMHz. The performance of schemes $I_1$ and $I_2$ were simulated over a PCB trace with length l=0.6 m at information rate $1/T_b$=4 Gbps in presence of Average White Gaussian Noise (AWGN) noise with psd $N_0/2$, and compared with that of ordinary binary signals. FIG. 8 shows the simulated variations of the event error probability, $P_e$, and the bit error probability, $P_{be}$, of the schemes with $E_b/N_0$, where $E_b = A^2 T_b$ is the bit energy, and an error event is an event that the receiver makes a decision in favor of an incorrect transmitted waveform.

It is seen from FIG. 8 that certain MILC schemes consistent with the present invention can perform significantly better than ordinary binary signals. It is noted here that, even though the minimum time separation between two MILC waveforms (T/K) is smaller than that of ordinary binary signals ($T_b$), they perform better because the actual transmission rate of MILC signals, 1/T, is smaller than that of ordinary binary signals, $1/T_b$. Therefore, MILC signals, comparatively, will experience less Inter-Symbol Interference (ISI), thereby improving performance. It is noted that, at high signal to noise ratios (SNR), $P_{be}$ is close to $P_e/L$, because the waveforms are assigned to binary sequences so that, whenever possible, those waveforms that are separated by the minimum distance are assigned to sequences that differ by a single bit. Among the two selected schemes, scheme $I_2$ with K=2, N=4 and L=5 performs best and gains over 5 dB at $P_e = 10^{-4.5}$ over ordinary binary signals. Comparing schemes $I_1$ and $I_2$, it is seen that even though $I_1$ has a better L/N ratio, $I_2$ performs better over this channel because $I_1$ uses 3 sub-intervals compared with 2 sub-intervals in case of $I_2$. At desired error probabilities in an actual chip to chip transmission (below about $10^{-8}$), significant gains can be expected by MILC signals over ordinary binary signals.

The present MILC technique, as exemplified above, is a general signaling technique that can be used in any baseband transmission system. Depending on the nature of the channel, one can select the best scheme within the constraints imposed by the application. Further, since the proposed scheme deals directly with the transmitted sequence which could be coded or uncoded, any type of source or channel coding can be readily employed with the proposed schemes. It is known that crosstalk is a dominant source of noise at higher data rates, and it is also known that the cross talk transfer function increases with frequency at higher frequencies [see I. Kalet and S. Shamai, "On the capacity of twisted wire pair: Gaussian model", IEEE Transactions on Communications, Vol. 38, pp. 379-383, March 1990]. Since the actual transmission rates of MILC schemes is lower than that of ordinary binary signals, the impact of cross talk on the proposed schemes will be comparatively less. Therefore, the gain of MILC schemes over ordinary binary signaling taking will be even higher than that over an AWGN channel shown in FIG. 8 when the effect of crosstalk is taken into account.

Hardware Embodiments

Figure 9:
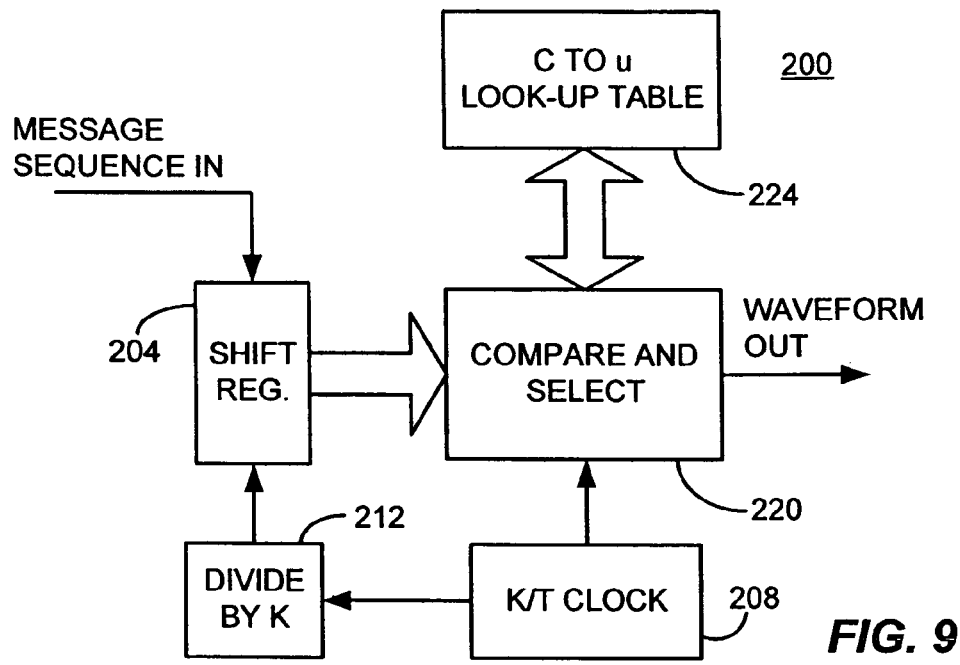
FIG. 9 is an illustrative embodiment of an MILC transmitter circuit consistent with certain embodiments of the present invention.

With reference to FIG. 9, it can be seen that an exemplary embodiment of the circuitry 200 used to embody a transmitter side for transmission of an MILC system is relatively simple once the waveforms that represent each message sequence is defined. In this exemplary embodiment, a message sequence (C) is received at a shift register 204. The shift register 204 clocks in data at the bit rate 1/T of the message sequence. In this example, a clock 208 running at a rate of K/T is divided by K at divider 212 in order to obtain the desired 1/T clock rate. When a complete message sequence word is loaded into shift register 204 or buffer memory, the message sequence is read out to a comparison and selection circuit 220, which may be hard wired logic or may operate under the control of a computer program running on a programmed processor. The compare and select circuit 220, uses the message sequence as an entry point to a look-up table 224 (similar in structure to TABLE II) which references values of the message sequence (C) to an output waveform (u) in order to determine the appropriate waveform to transmit as an output. Once identified, the output waveform (signal pattern) is clocked out of the compare and select circuit 220 at the waveform clock rate of K/T.

A data encoder, consistent with certain embodiments has a circuit for receiving one of M message sequences lasting N intervals of duration T, where T is a bit time in the message sequence. Another circuit is provided for converting each message sequence to one of M signal patterns of length L bits, where $M \geq 2^L$, and wherein: each time interval T is divided into K sub-intervals, where K is an integer greater than one; each of the M signal patterns contains transitions in signal levels separated by at least T; and transitions in signal levels are permitted not only at integer multiples of the interval T, but also at times falling between the boundaries of the interval T at approximately the boundaries of the K sub-intervals.

Another data encoder, consistent with certain embodiments has an input that receives one of M message sequences lasting N intervals of duration T, where T is a bit time in the message sequence. A mapping circuit translates each message sequence to one of M signal patterns of length L bits, where $M > 2^N$, and wherein: each time interval T is divided into K sub-intervals, where K is an integer greater than one; each of the M signal patterns contains transitions in signal levels separated by at least T; and transitions in signal levels are permitted not only at integer multiples of the interval T, but also at times falling between the boundaries of the interval T at approximately the boundaries of the K sub-intervals.

Figure 10:
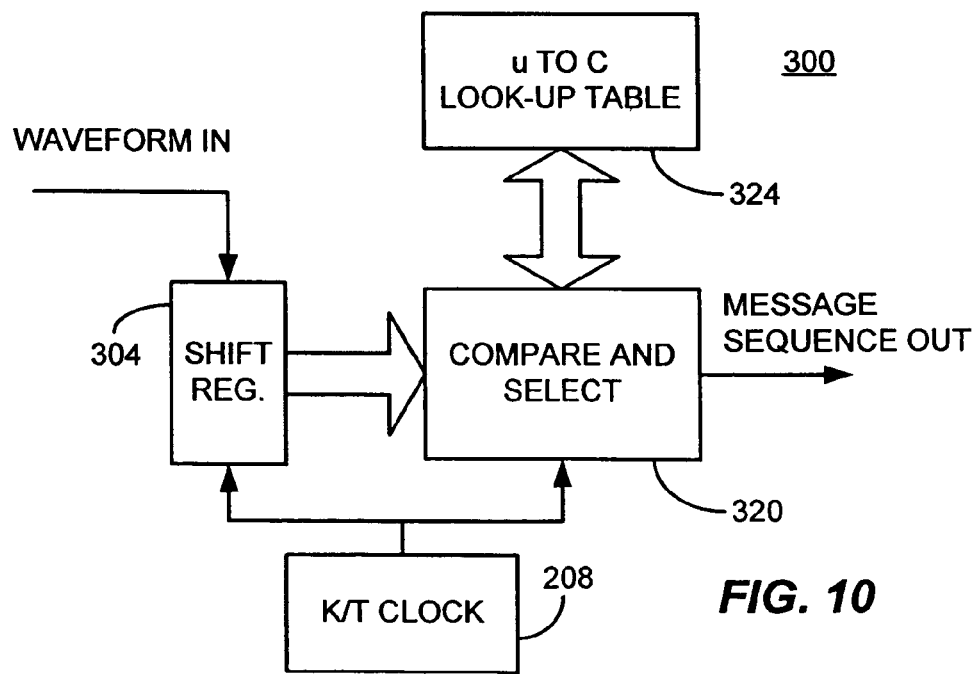
FIG. 10 is an exemplary embodiment of an MILC receiver circuit consistent with certain embodiments of the present invention.

With reference to FIG. 10, it can be seen that an exemplary embodiment of the circuitry 300 used to embody a receiver side for transmission of an MILC system is also relatively simple once the waveforms that represent each message sequence is defined. In this exemplary embodiment, a signal pattern (waveform u) is received at a shift register 304. The shift register or buffer 304 clocks in data and samples it at the bit rate K/T of the signal pattern. In this example, a clock 208 running at a rate of K/T is used to clock the shift register. When a complete signal pattern is loaded into shift register 304, the signal pattern of the received waveform is read out to a comparison and selection circuit 320, which may be hard wired logic or may operate under the control of a computer program running on a programmed processor. The compare and select circuit 320, uses the received message sequence as the decision vector D and takes the dot product of the decision vector with the potential waveform values stored in look-up table 324 (also similar in structure to TABLE II). The metric M is calculated as discussed in connection with FIG. 4 and equations 15-17 in order to determine which reference values (u) are the most likely match for the input waveform. The lookup table 324 is then used to match the waveform with the greatest value of the metric with the message sequence (C) in order to determine the appropriate message sequence that was received. Once identified, the message sequence is output at the message sequence data rate.

Thus, a data decoder, consistent with certain embodiments has a circuit that receives a digital data signal having one of M signal patterns of L bits spanning K sub-intervals of an interval T, where K is an integer greater than one, wherein the K sub-intervals span N intervals of T seconds each, and where $M > 2^N$, and wherein transitions in signal levels occur not only at integer multiples of the interval T, but also at times falling between the boundaries of the interval T at approximately the boundaries of the K sub-intervals. A circuit maps the received digital data signal to one of the M signal patterns to recover one of M message sequences.

Another data decoder, consistent with certain embodiments has an input that receives a digital data signal having one of M signal patterns of length L bits spanning K sub-intervals of an interval T, where K is an integer greater than one, wherein the K sub-intervals span N intervals of T seconds each, and where $M>2^N$, and wherein transitions in signal levels occur not only at integer multiples of the interval T, but also at times falling between the boundaries of the interval T at approximately the boundaries of the K sub-intervals. A mapping circuit that maps the received digital data signal to one of the M signal patterns to recover one of M message sequences.

The encoding and decoding devices described herein are but one mechanism for realizing encoding and decoding according to the MILC technique described herein. Those skilled in the art will appreciate, upon consideration of the present teachings, that many other embodiments are possible including those using hard wired logic or computer program controlled processing as well as others.

The selection of an appropriate message sequence for a given waveform in the receiver can be made using any suitable mechanism for matching the waveform in to a message sequence. In one example embodiment, the waveform in can be multiplied by each of the M waveforms stored in the lookup table 324 and the results compared. The result with the highest value is deemed to be the message sequence that is output.

In another embodiment, the dependence of the present message sequence on a prior sequence can be capitalized upon to simplify the search somewhat. By noting that transitions can only occur in time increments greater than T, and since the waveform in any current block depends on the last bit of the previous block, the most likely waveform in the current block can be found by using the decision variables of the current block and that of the last bit of the previous block, and searching among all possible $2^{(L+1)}$ waveforms allowing the last bit of the previous block to be 1 or −1, as described above. Then, the metric of equation (16) can be applied and the receiver makes a decision in favor of the waveform with the highest metric.

Accordingly, a multi-interval line coding (MILC) technique which operates over blocks of N intervals can increase the transmission rate without expanding the bandwidth or using higher order signaling. MILC schemes divide every interval T into K sub-intervals, and allow the signals to make amplitude transitions at the end of sub-intervals. However, the waveforms are generated by maintaining the duration of all individual pulses at least at T thereby maintaining spectral variations close to that of ordinary binary signals. Numerical results presented for data transmission over a printed circuit board (PCB) trace indicate that MILC schemes perform significantly better than ordinary binary signaling at the same information transfer rate. While this coding technique may be particularly advantageous at higher date rates, embodiments consistent with the present invention may be used at any suitable data rate without limitation.

Those skilled in the art will recognize, upon consideration of the above teachings, that certain of the above exemplary embodiments of MILC encoders and decoders can be implemented by use of a programmed processor. However, the invention is not limited to such exemplary embodiments, since other embodiments could be implemented using hardware component equivalents such as special purpose hardware and/or dedicated processors. The functionality described above can be implemented not only using the look-up tables described above, but also using hard-wired logic or processors embedded within ASICs (Application Specific Integrated Circuits), custom and semi-custom integrated circuits, discrete logic and logic integrated within circuits, systems and interfaces. Similarly, general purpose computers, microprocessor based computers, micro-controllers, optical computers, analog computers, dedicated processors, application specific circuits and/or dedicated hard wired logic may be used to construct alternative equivalent embodiments, without limitation. Thus, embodiments consistent with the present invention can be devised using any manner of hardware, or programmed processing without limitation.

While embodiments consistent with the present invention have been described in terms of binary signals, other embodiments can be realized by extending the present teachings to higher-order signals. In non-binary embodiments, all equations with binary signals can be readily modified to any non-binary scheme and the total number of waveforms M can be calculated. For example, if three levels (−1,0 and +1) are used in this MILC technique, 5 bits can be transmitted over 3 intervals with N=3 and K=2, and 8 bits can be transmitted over 4 intervals with N=4 and K=3. Note that 8 bits over 4 intervals is equivalent to 4-PAM but this can be done using only 3 levels by use of embodiments consistent with MILC. Accordingly, although the exemplary embodiments are shown with binary, higher order implementations are also possible within the scope of the present teachings. Thus, the signals that are encoded could be either binary or non-binary without limitation. Moreover, embodiments consistent with the present invention can be used in conjunction with any error control coding.

The processes carried out in encoding and decoding can be carried out by use of a programmed processor or hard logic executing functions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of encoding data, carried out by at least one of a hardware device and a computer executing a software program within, comprising:
   for each time interval T, establishing K sub-intervals, where K is an integer greater than one;
   for N intervals of T seconds, transmitting one of M signal patterns each representing a message sequence, where $M>2^N$ from a transmitter circuit;
   wherein, each of the M signal patterns has L bits and has transitions in signal levels separated by at least T; and
   wherein transitions in signal levels are permitted not only at integer multiples of the interval T, but also at times falling between the boundaries of the interval T at approximately the boundaries of the K sub-intervals.

2. The method according to claim 1, wherein the M signal patterns include no transitions within one of the first and the last T seconds of the N intervals.

3. The method according to claim 1, wherein the transitions that occur between the boundaries of the interval T are permitted at times that are approximately equally spaced over the interval T with a spacing of approximately T/K.

4. The method according to claim 1, further comprising mapping a message sequence to one of the M signal patterns for transmission.

5. The method according to claim 4, wherein the mapping further comprises looking up the message sequence in a lookup table to identify a signal pattern associated with the message sequence to be transmitted.

6. The method according to claim 1, further comprising using a lookup table to identify a digital signal pattern associated with the message sequence.

7. The method according to 1, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

8. The method according to claim 1, wherein L is selected to be the largest integer such that $M \geq 2^L$.

9. The method according to claim 1, wherein the data comprises binary data.

10. The method according to claim 1, wherein the data comprises non-binary data.

11. A coding method, carried out on at least one of a hardware device and a computer executing a software program within, comprising:
    selecting a value of N and a value of K, where N=number of intervals used to transmit M distinct signal patterns and K=the number of sub-intervals assigned per interval T using a transmitter circuit;
    assigning K sub-intervals to each interval T;
    choosing a number of transitions in signal level to be allowed within the N intervals, wherein transitions are permitted at integer multiples of T/K for each interval;
    computing a number of waveforms M that can be transmitted over N intervals, wherein no transitions are permitted in one of the first and last intervals in the N intervals, and wherein a width of at least T seconds is maintained between any two transitions;
    selecting a set of waveforms of length L such that $M \geq 2^L$, where M=number of waveforms or signal patterns that can be transmitted over N intervals; and
    mapping a set of M message sequences to the M waveforms.

12. The method according to claim 11, further comprising transmitting one of the M waveforms to represent one of M the message sequences.

13. The method according to claim 11, wherein the M waveforms include no transitions within one of the first and the last T seconds of the N intervals.

14. A method of decoding data, carried out on at least one of a hardware device and a computer executing a software program within, comprising:
    at a receiver circuit, receiving a digital data signal having one of M signal patterns of L bits spanning N intervals of T seconds;
    wherein each interval T comprises K sub-intervals, where K is an integer greater than one, and where $M>2^N$;
    wherein transitions in signal levels occur not only at integer multiples of the interval T, but also at times falling between the boundaries of the interval T at approximately the boundaries of the K sub-intervals; and
    mapping the received digital data signal to one of die M signal patterns to recover one of M message sequences.

15. The method according to claim 14, wherein the M signal patterns include no transitions within one of the first and the last T seconds of the N intervals.

16. The method according to claim 14, wherein the transitions that occur between the boundaries of the interval T are permitted at times that are approximately equally spaced over the interval T with a spacing of approximately T/K.

17. The method according to claim 14, wherein the mapping further comprises:
    reading a signal level at approximately every T/K seconds at a time between the permitted times for transitions;
    assigning a binary value to each of the signal levels read over a time period of NT to produce a binary pattern; and
    mapping the binary pattern to a message pattern.

18. The method according to claim 14, wherein the mapping further comprises:
    reading a signal level at approximately every T/K seconds at a time between the permitted times for transitions;
    assigning a binary value to each of the signal levels read over a time period of NT to produce a binary pattern; and
    looking up the binary pattern in a lookup table to determine a message sequence associated with the binary pattern.

19. The method according to claim 14, wherein the mapping is carried out using a lookup table to identity a message sequence associated with the received digital data signal.

20. The method according to 14, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

21. The method according to claim 14, wherein L is selected to be the largest integer such that $M>2^L$.

22. The method according to claim 14, wherein the data comprises binary data.

23. The method according to claim 14, wherein the data comprises non-binary data.

24. A decoding process, carried out on at least one of a hardware device and a computer executing a software program within, comprising:
    at a receiver circuit, receiving an L bit waveform $C_i$, wherein the received waveform represents a sequence of bits arranged in a pattern that spans a plurality of N intervals of duration T, with each interval being divided into K subintervals;
    wherein no transitions are permitted during either the first or last interval;

sampling the waveform during each sub-interval, and during the interval in which no transitions are permitted;

forming a sequence of decision variables D made up of a binary representhation of the sampled waveform;

computing a metric $M_i$ for waveform $C_i$ by taking the dot product of $C_i$ and D;

selecting a waveform with the highest metric $M_i$ as a most likely received signal; and mapping a corresponding L bit sequence to one of M message sequences, where $M \geq 2^L$.

25. The decoding process according to claim 24, wherein the mapping is carried by looking up the M message sequence corresponding to the L bit sequence on a lookup table.

26. The decoding process according to claim 24, wherein the decision variable sequence used for the detection of any block can be expressed as $$D=(D_{lp},D_{lp},\ldots,D_{lp},D_1,D_2,\ldots,D_{K(N-1)},D_{lc}, D_{lc},\ldots,D_{lc}) \quad (15)$$

where, $D_{lp}$ and $D_{lc}$, each of which are repeated K times in vector D, are the decision variables during the last interval of the previous and current blocks respectively.

27. The decoding process according to claim 24, wherein the M waveforms include no transitions within one of the first and the last T seconds of each of the N intervals.

28. A data decoder, comprising:

means for receiving a digital data signal having one of M signal patterns of L bits spanning N intervals of T seconds;

wherein each interval T comprises K sub-intervals, where K is an integer greater than one, and where $M > 2^N$;

wherein transitions in signal levels occur not only at integer multiples of the interval T, but also at times falling between the boundaries of the interval T at approximately the boundaries of the K sub-intervals; and means for mapping the received digital data signal to one of the M signal patterns to recover one of M message sequences.

29. The decoder according to claim 28, wherein the decoder is implemented in at least one of a hardware device and a computer executing a software program within.

30. The decoder according to claim 28, wherein the M signal patterns include no transitions within one of the first and the last T seconds of each of the N intervals.

31. The decoder according to claim 28, wherein the transitions that occur between the boundaries of the interval T are permitted at times that are approximately equally spaced over the interval T with a spacing of approximately T/K.

32. The decoder according to claim 28, wherein the means for mapping further comprises:

means for reading a signal level at approximately every T/K seconds at a time between the permitted times for transitions;

means for assigning a binary value to each of the signal levels read over a time period of NT to produce a binary pattern; and means for translating the binary pattern to a message pattern.

33. The decoder according to claim 28, wherein the means for mapping further comprises:

means for reading a signal level at approximately every T/K seconds at a time between the permitted times for transitions;

means for assigning a binary value to each of the signal levels read over a time period of NT to produce a binary pattern; and means for looking up the binary pattern in a lookup table to determine a message sequence associated with the binary pattern.

34. The decoder according to claim 28, wherein the mapping is carried out using a lookup table to identify a message sequence associated with the received digital data signal.

35. The decoder according to 28, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

36. The decoder according to claim 28, wherein L is selected to be the largest integer such that $M \geq 2^L$.

37. A data decoder, comprising:

an input that receives a digital data signal having one of M signal patterns of L bits spanning N intervals of T seconds;

wherein each interval T comprises K sub-intervals, where K is an integer greater than one, and where $M > 2^N$;

wherein transitions in signal levels occur not only at integer multiples of the interval T, but also at times falling between the boundaries of the interval T at approximately the boundaries of the K sub-intervals; and a mapping circuit that maps the received digital data signal to one of the M signal patterns to recover one of M message sequences.

38. The decoder according to claim 37, wherein the decoder is implemented in at least one of a hardware device and a computer executing a software program within.

39. The decoder according to claim 37, wherein the M signal patterns include no transitions within one of the first and the last T seconds of each of the N intervals.

40. The decoder according to claim 37, wherein the transitions that occur between the boundaries of the interval T are permitted at times that are approximately equally spaced over the interval T with a spacing of approximately T/K.

41. The decoder according to claim 37, wherein the mapping circuit further comprises:

means for reading a signal level at approximately every T/K seconds at a time between the permitted times for transitions;

means for assigning a binary value to each of the signal levels read over a time period of NT to produce a binary pattern; and a look up table that translates the binary pattern to a message pattern.

42. The decoder according to claim 37, wherein the mapping is carried out using a lookup table to identify a message sequence associated with the received digital data signal.

43. The decoder according to 37, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

44. The decoder according to claim 37, wherein L is selected to be the largest integer such that $M \geq 2^L$.

45. A method of communicating a data signal, comprising: from a transmitting circuit, transmitting the data signal to a receiving device, the data signal comprising;

a signal pattern selected as one of M possible signal patterns transmitted over N time intervals of T seconds that represent one of M possible message sequences, where $M > 2^N$;

wherein each time interval T has K sub-intervals, where K is an integer greater than one;

wherein, each of the M signal patterns of L bits having transitions in signal levels separated by at least T;

wherein transitions in signal levels occur not only at integer multiples of the interval T, but also at times falling between the boundaries of the interval T at approximately the boundaries of the K sub-intervals.

46. The method of communicating a data signal according to claim 45, wherein the M signal patterns include no transitions within one of the first and the last T seconds of the N intervals.

47. The method of communicating a data signal according to claim 45, wherein the transitions that occur between the boundaries of the interval T are permitted at times that are approximately equally spaced over the interval T with a spacing of approximately T/K.

48. The method of communicating a data signal according to claim 45, wherein L is selected to be the largest integer such that $M \geq 2^L$.

49. The method of communicating a data signal according to claim 45, wherein the data signal comprises a binary data signal.

50. The method of communicating a data signal according to claim 45, wherein the data signal comprises a non-binary data signal.

51. A method of communicating a data signal, comprising: from a transmitting circuit, transmitting the data signal, the data signal comprising:
   a plurality of pulses having a minimum pulse duration of T;
   said pulses arranged in a signal pattern selected as one of M possible signal patterns of L bits transmitted over N time intervals, with each time interval being of T seconds in duration, to represent one of M possible message sequences, where $M > 2^N$;
   said plurality of pulses having transitions that occur at times falling between the boundaries of the time interval T; and
at a receiving device, receiving the data signal.

52. The method of communicating a data signal according to clam 51, wherein each time interval T has K sub-intervals, where K is an integer greater than one.

53. The method of communicating a data signal according to claim 52, wherein transitions in signal levels occur not only at integer multiples of the interval T, but also at times falling between the boundaries of the interval T at approximately the boundaries of the K sub-intervals.

54. The method of communicating a data signal according to claim 51, wherein the M signal patterns include no transitions within one of the first and the last T seconds of the N intervals.

55. The method of communicating a The data signal according to claim 51, wherein the transitions that occur between the boundaries of the interval T are permitted at times that are approximately equally spaced over the interval T with a spacing of approximately T/K.

56. The method of communicating a data signal according to claim 51, wherein L is selected to be the largest integer such that $M \geq 2^L$.

57. The method of communicating a data signal according to claim 51, wherein the data signal comprises a binary data signal.

58. The method of communicating a data signal according to claim 51, wherein the data signal comprises a non-binary data signal.

59. A communication system for communicating a data signal, comprising:
   a transmitter that transmits the data signal, the data signal comprising:
      a plurality of pulses having a minimum pulse duration of T arranged in data signal intervals;
      wherein transitions in the signal levels of the data signal are permitted not only at integer multiples of the interval T, but also at times falling between the boundaries of the interval T;
      wherein when data signals are observed over N intervals, the data signals can be mapped to M possible message sequences of length L for each of $2^L$ data signals, where $M \geq 2^L$;
      wherein transitions are not permitted in the waveform either during the first interval or alternatively during the last interval in a block of N intervals; and
   a receiver that receives the data signal.

60. The communication system according to claim 59, wherein each time interval T has K sub-intervals, where K is an integer greater than one.

61. The communication system according to claim 60, wherein transitions in signal levels occur not only at integer multiples of the interval T, but also at times falling between the boundaries of the interval T at approximately the boundaries of the K sub-intervals.

62. The communication system according to claim 59, wherein the M signal patterns include no transitions within one of the first and the last T seconds of the N intervals.

63. The communication system according to claim 59, wherein the transitions that occur between the boundaries of the interval T are permitted at times that are approximately equally spaced over the interval T with a spacing of approximately T/K.

64. The communication system according to claim 59, wherein L is selected to be the largest integer such that $M \geq 2^L$.

65. The communication system, according to claim 59, wherein the data signal comprises a binary data signal.

66. The communication system according to claim 59, wherein the data signal comprises a non-binary data signal.

67. A data encoder, comprising:
   means for receiving one of M message sequences lasting N intervals of duration T, where T is a bit time in the message sequence;
   means for conveying each message sequence to one of M signal patterns of length L bits, where $M > 2^N$, and wherein:
   each time interval T is divided into K sub-intervals, where K is an integer greater than one;
   each of the M signal patterns contains transitions in signal levels separated by at least T; and
   transitions in signal levels are permitted not only at integer multiples of the interval T, but also at times falling between the boundaries of the interval T at approximately the boundaries of the K sub-intervals.

68. The data encoder according to claim 67, wherein the encoder is implemented in at least one of a hardware device and a computer executing a software program within.

69. The data encoder according to claim 67, wherein the M signal patterns include no transitions within one of the first and the last T seconds of the N intervals.

70. The data encoder according to claim 67, wherein the transitions that occur between the boundaries of the interval T are permitted at times that are approximately equally spaced over the interval T with a spacing of approximately T/K.

71. The data encoder according to claim 67, wherein the means for conveying comprising means for mapping a message sequence to one of the M signal patterns for transmission.

72. The data encoder according to claim 67, wherein the means for mapping further comprises means for looking up the message sequence in a lookup table to identify a signal pattern associated with the message sequence to be transmitted.

73. The data encoder according to claim 67, further comprising a lookup table that identifies a digital signal pattern associated with the message sequence.

74. The data encoder according to 67, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

75. The data encoder according to claim 67, wherein L is selected to be the largest integer such that $M \geq 2^L$.

76. A data encoder, comprising:

an input that receives one of M message sequences lasting N intervals of duration T, where T is a bit time in the message sequence;

a mapping circuit that translates each message sequence to one of M signal patterns of length L bits, where $M > 2^N$, and wherein:

each dine interval T is divided into K sub-intervals, where K is an integer greater than one;

each of the M signal patterns contains transitions in signal levels separated by at least T; and transitions in signal levels are permitted not only at integer multiples of the interval T, but also at times falling between the boundaries of the interval T at approximately the boundaries of the K sub-intervals.

77. The data encoder according to claim 76, wherein the encoder is implemented in at least one of a hardware device and a computer executing a software program within.

78. The data encoder according to claim 76, wherein the M signal patterns include no transitions within one of the first and the last T seconds of the N intervals.

79. The data encoder according to claim 76, wherein the transitions that occur between the boundaries of the interval T are permitted at times that arc approximately equally spaced over the interval T with a spacing of approximately T/K.

80. The data encoder according to claim 76, wherein the mapping circuit looks up the message sequence in a lookup table to identify a signal pattern associated with the message sequence to be transmitted.

81. The data encoder according to claim 76, further comprising a lookup table used by the mapping circuit to identify a digital signal pattern associated with the message sequence.

82. The data encoder according to 76, wherein values of N, K and L are selected to be one of the following pairs of integers: N=3, K=3, L=4; N=4, K=2, L=5; N=4, K=4, L=6; N=5, K=3, L=7; N=5, K=4, L=8; N=5, K=5, L=9; N=6, K=3, L=9; N=6, K=4, L=10; and N=6, K=5, L=11.

83. The data encoder according to claim 76, wherein L is selected to be the largest integer such that $M \geq 2^L$.

* * * * *